United States Patent
Mochizuki et al.

(10) Patent No.: US 11,080,582 B2
(45) Date of Patent: Aug. 3, 2021

(54) CONTACTLESSLY READABLE TAG, METHOD FOR MANUFACTURE OF CONTACTLESSLY READABLE TAG, IDENTIFICATION DEVICE, AND METHOD FOR READING IDENTIFYING INFORMATION

(71) Applicant: Konica Minolta, Inc., Tokyo (JP)

(72) Inventors: Makoto Mochizuki, Tokyo (JP); Shuji Murakami, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/651,379

(22) PCT Filed: Jul. 26, 2018

(86) PCT No.: PCT/JP2018/028066
§ 371 (c)(1),
(2) Date: Mar. 27, 2020

(87) PCT Pub. No.: WO2019/064869
PCT Pub. Date: Apr. 4, 2019

(65) Prior Publication Data
US 2020/0293848 A1    Sep. 17, 2020

(30) Foreign Application Priority Data
Sep. 29, 2017   (JP) .............................. JP2017-190590

(51) Int. Cl.
*G06K 7/06*    (2006.01)
*G06K 19/07*   (2006.01)
(Continued)

(52) U.S. Cl.
CPC ..... *G06K 19/0723* (2013.01); *G06K 7/10366* (2013.01); *G06K 19/07758* (2013.01)

(58) Field of Classification Search
CPC .......... G06K 19/0723; G06K 7/07758; G06K 7/10366
(Continued)

(56) References Cited

U.S. PATENT DOCUMENTS 7,969,281 B2 *   6/2011   Kofman ............. G06K 7/10009
                                                       340/10.1
2004/0159708 A1 * 8/2004  Yogev ................ G06K 7/10009
                                                       235/492
(Continued)

FOREIGN PATENT DOCUMENTS

| JP | 11-096326 | 4/1999 |
| JP | 2016-018271 A | 2/2016 |
| JP | 2016-207011 | 12/2016 |

OTHER PUBLICATIONS

International Patent Application No. PCT/JP2018/028066; Int'l Written Opinion and Search Report; dated Sep. 25, 2018; 6 pages.

*Primary Examiner* — Ahshik Kim
(74) *Attorney, Agent, or Firm* — BakerHostetler

(57) ABSTRACT

An objective of the present invention is to provide a contactlessly readable tag, method for manufacture of contactlessly readable tag, identification device, and method for reading identifying information, capable of effecting an increased capacity in recorded information and improved precision in reading said recorded information. Provided is a contactlessly readable tag, comprising a metal part and an electromagnetic wave absorption body. The manner in which the metal part and the electromagnetic wave absorption body are installed is associated with identifying information. When the tag is irradiated with electromagnetic waves, it is possible to identify the identifying information on the basis of the amplitude of the electromagnetic waves (Continued)

reflected by the tag, and the shift in either the frequency or the phase of said reflected electromagnetic waves.

23 Claims, 20 Drawing Sheets

(51) Int. Cl.
    *G06K 7/10*          (2006.01)
    *G06K 19/077*     (2006.01)

(58) Field of Classification Search
    USPC ........................................................ 235/451
    See application file for complete search history.

(56) References Cited

U.S. PATENT DOCUMENTS

| | | | |
|---|---|---|---|
| 2005/0280539 A1* | 12/2005 | Pettus | H01Q 21/062 340/572.1 |
| 2009/0014520 A1 | 1/2009 | Kofman et al. | |
| 2020/0250387 A1* | 8/2020 | Hiraoka | G06K 7/10366 |

* cited by examiner

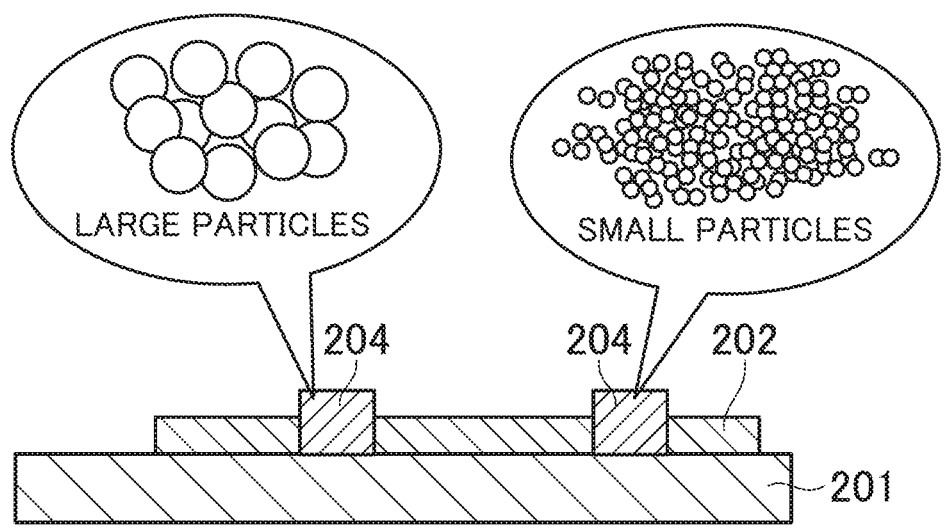
FIG. 17
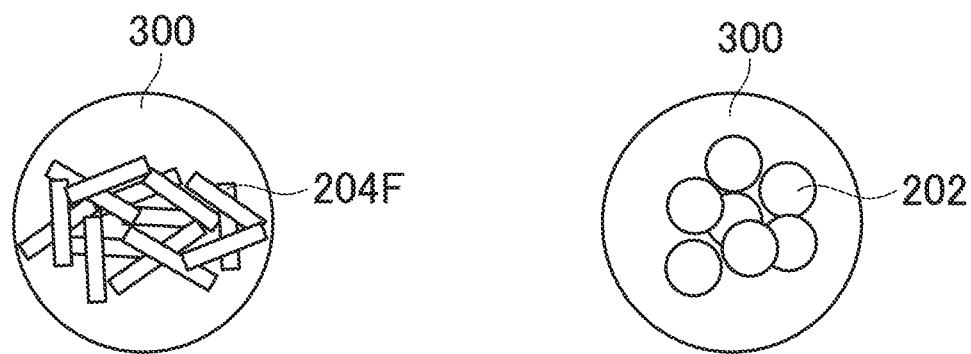
FIG. 18A
FIG. 18B

CONTACTLESSLY READABLE TAG, METHOD FOR MANUFACTURE OF CONTACTLESSLY READABLE TAG, IDENTIFICATION DEVICE, AND METHOD FOR READING IDENTIFYING INFORMATION The present U.S. Patent Application is U.S. National Phase Application under 35 U.S.C. 371 of International Application PCT/JP2018/028066 filed on Jul. 26, 2018, which claims a priority under the Paris Convention to Japanese Patent Application No. 2017-190590 filed on Sep. 29, 2017, the entire disclosures of which are incorporated herein by reference in their entireties.

TECHNICAL FIELD

The present invention relates to a contactlessly readable tag, a method for manufacturing a contactlessly readable tag, a determination apparatus, and an identification information reading method.

BACKGROUND ART

In the related art, barcodes have been known as an example of a tag for associating goods-related information or the like. Being low in cost, barcodes are currently printed on various goods and widely used as a means for digitizing goods-related information. On the other hand, in a case of a barcode tag, in order to read printed content correctly, an operator needs to bring a barcode reader close to the barcode in a few centimeters and thus finds this reading operation troublesome. In addition, if a portion where the barcode is printed is smudged, unfortunately, it is not possible to read the printed content. Furthermore, since a barcode is printed at an observable position on a surface of goods, unfortunately, a malicious person may easily rewrite the barcode.

A tag overcoming the above issues is an electronic tag called RFID (e.g., see PTL 1). In a case of an RFID tag, even in a distance of a few tens of centimeters to a few meters, or even with some smudge, content of the tag can be read by using an RFID reader. Thus, an operator who reads the tag is much less burdened than in a case of a barcode. On the other hand, with the RFID technology of the related art, an IC chip is used for the tag. Since the IC chip is easily affected by static electricity or vibrations, unfortunately, the recorded content may change in the process of logistics or become unreadable because of breaking of a circuit, for example.

As an alternative technique, so-called chipless RFID has been attracting attention. In the chipless RFID, a tag is formed without an IC chip. In an example of the chipless RFID, a tag is formed by patterning metal ink on a base, such as paper, the tag is irradiated with an electromagnetic wave from a reader, and a diffraction signal on the metal pattern on the tag is subjected to reflected wave analysis, and thereby a pattern shape of the tag and identification information are read (e.g., see PTL 2).

CITATION LIST

Patent Literatures

PTL 1: Japanese Patent Application Laid-Open No. 2016-207011
PTL 2: U.S. Patent Application No. 2009/0014520

SUMMARY OF INVENTION

Technical Problem

The technique described in PTL 2, however, contains issues in readability of a diffraction signal and increase in capacitance of information to be recorded on a tag, i.e., capacitance of recorded information.

Specifically, with the technique described in PTL 2, unless an electromagnetic wave is radiated right from the front of a tag, a degree of diffraction changes, which may unfortunately lead to misreading. In addition, with the technique described in PTL 2, a metal pattern cannot be highly conductive as a result of influence of ink additives or the like, and thus, it has been difficult to obtain a diffraction signal with sufficient intensity.

In addition, in chipless RFID of the related art as described in PTL 2, an intensity difference between a reflected wave from a metal section and a reflected wave from a base portion other than the metal section is insufficient, and a measured dynamic range is small. Thus, with the related art, it is difficult to increase recording density by using such a dynamic range width that the recorded information is intermediate reflected wave intensity between the tag-constituting metal section and the base portion.

An object of the present invention is to provide a contactlessly readable tag, a method for manufacturing a contactlessly readable tag, a determination apparatus, and an identification information reading method by which capacitance of recorded information and reading accuracy can be increased.

Solution to Problem

A contactlessly readable tag according to the present invention comprises:
a metal section; and
an electromagnetic wave absorber,
wherein an installation manner of the metal section and the electromagnetic wave absorber is associated with identification information, and
wherein, when an electromagnetic wave is radiated to the tag, the identification information is determinable based on an amplitude of the electromagnetic wave reflected on the tag and a frequency shift or a phase shift.

A method for manufacturing a contactlessly readable tag including a metal section and an electromagnetic wave absorber, the method comprising:
forming at least one of the metal section and the electromagnetic wave absorber on a base by a printing method.

A determination apparatus according to the present invention is an apparatus used for determining the contactlessly readable tag described above, comprising:
a determination section that determines, when an electromagnetic wave is radiated to the metal section and the electromagnetic wave absorber, the identification information based on an amplitude of an electromagnetic wave reflected on the metal section and the electromagnetic wave absorber and a frequency shift or a phase shift.

An identification information reading method is a method for reading identification information from a contactlessly readable tag including a metal section and an electromagnetic wave absorber, an installation manner of the metal section and the electromagnetic wave absorber being associated with the identification information, the method comprising:

determining, when an electromagnetic wave is radiated to the contactlessly readable tag, the identification information based on an amplitude of an electromagnetic wave reflected on the metal section and the electromagnetic wave absorber and a frequency shift or a phase shift.

Advantageous Effects of Invention

According to the present invention, capacitance of recorded information and reading accuracy can be increased.

BRIEF DESCRIPTION OF DRAWINGS

FIG. 2 illustrates an outline of reading a tag by an imaging method in an RFID tag system according to this embodiment, where

FIG. 11 is sectional views illustrating other structure examples of the RFID tag according to this embodiment, where

FIG. 14 is a perspective view illustrating another structure example of the RFID tag according to this embodiment, where

FIG. 17 is a sectional view illustrating another structure example of the RFID tag according to this embodiment and illustrates portions of metal in an enlarged manner;

FIG. 18 illustrates, for example, a method for manufacturing the RFID tag according to this embodiment, where FIG. 18A schematically illustrates metal-containing toner and FIG. 18B schematically illustrates resin-containing toner;

DESCRIPTION OF EMBODIMENTS

A contactlessly readable tag according to this embodiment is a chipless RFID tag without an IC chip (hereinafter also simply referred to as a "tag") and includes a metal section and an electromagnetic wave absorber. An installation manner of the metal section and the electromagnetic wave absorber is associated with identification information. In other words, if the installation manner of the metal section and electromagnetic wave absorber differs, the identification information differs. Herein, the term "installation manner" means, for example, the arrangement (e.g., positional relationship, shape, or size) of the metal section and the electromagnetic wave absorber and also includes a mixed state (e.g., mixture ratio) of metal and the electromagnetic wave absorber. Specific examples of the installation manner of the metal section and the electromagnetic wave absorber will be described later with reference to drawings.

In addition, in the contactlessly readable tag according to this embodiment, if an electromagnetic wave (emitted wave)

is radiated from a tag reader, on the basis of reflection characteristics of the electromagnetic wave (reflected wave) reflected on the metal section and the electromagnetic wave absorber in the tag, identification information held in the tag is determined. Herein, the term "reflection characteristics" includes an amplitude of the reflected electromagnetic wave (e.g., a magnitude of the amplitude or a pattern of the magnitude), a frequency shift, or a phase shift (change or deviation). As an example, even if reflected electromagnetic waves have the same amplitude, one with no frequency shift and phase shift (first tag), one with no frequency shift and with a phase shift (second tag), and one with a frequency shift and with no phase shift (third tag) are information items different from one another. In this manner, in this embodiment, the magnitude of the amplitude of the electromagnetic wave reflected on the tag and the frequency shift or the phase shift are detected as electromagnetic wave reflection information, and the identification information corresponding to the electromagnetic wave reflection information is determined.

Figure 1A:
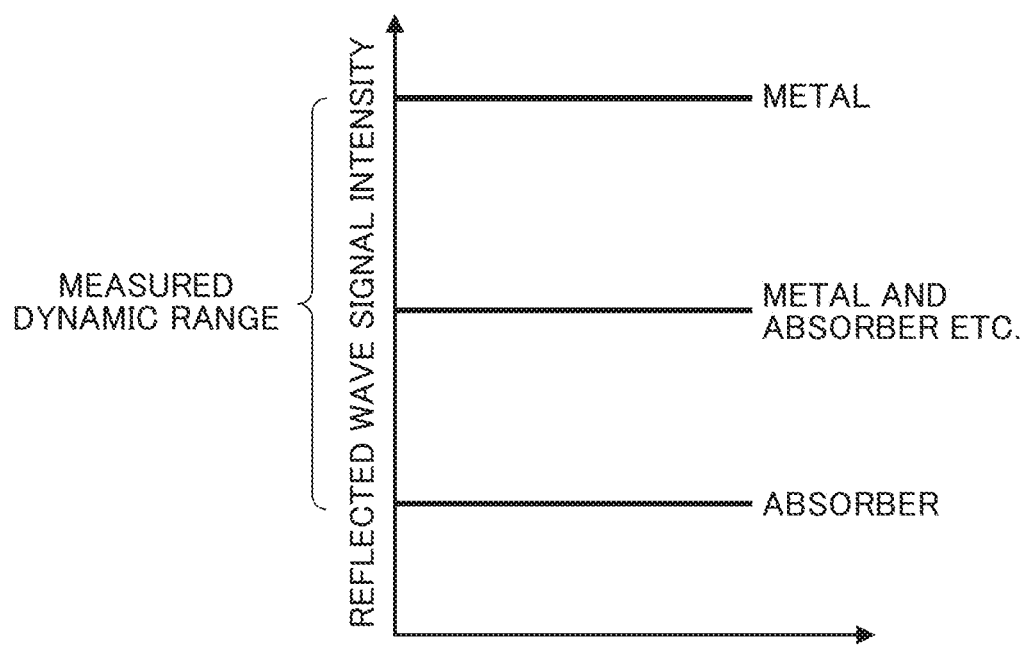
FIG. 1 is a characteristic diagram of measured intensity of a reflected wave from an RFID tag according to this embodiment in comparison with an example of the related art, where FIG. 1A schematically illustrates a case of this embodiment and FIG. 1B schematically illustrates a case of the example of the related art.
Figure 1B:
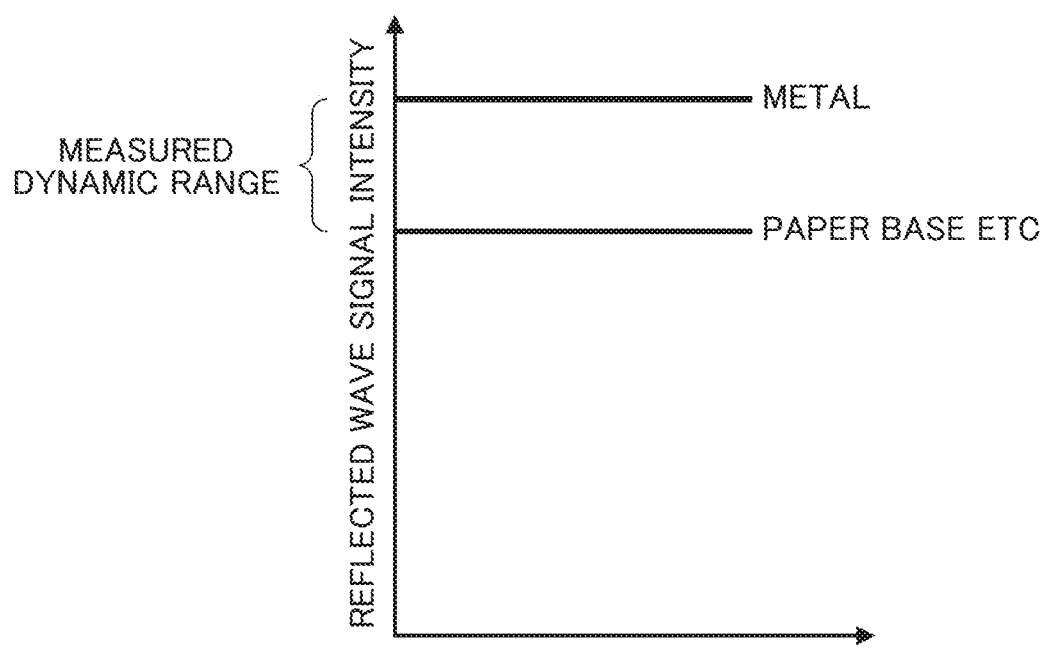

FIG. 1 illustrates measured intensity of a reflected wave from an RFID tag according to this embodiment in comparison with an example of the related art. Herein, FIG. 1A illustrates measurement results of the RFID tag according to this embodiment, and FIG. 1B illustrates measurement results of a chipless RFID tag of the related art. As is found from comparison between FIG. 1A and FIG. 1B, according to this embodiment, signal intensity of a reflected wave has a wide measured dynamic range, and identification information can be read with a high SN ratio maintained.

In addition, according to this embodiment in which the SN ratio is to be increased, by mixing metal and an electromagnetic wave absorber, for example, a material having intermediate reflection characteristics between the metal and the electromagnetic wave absorber can be provided in the tag, and capacitance of recorded information can be increased. That is, according to this embodiment, signal intensity between a portion of the metal, which outputs a high reflected-wave signal, and a portion of the electromagnetic wave absorber, which outputs an extremely low reflected-wave signal, can further be recorded as data, and an information amount to be recorded on the tag can be increased.

Hereinafter, for example, a principle for reading the tag used in this embodiment will be more specifically described. As a chipless RFID reading method, there are a method using resonance (hereinafter referred to as a "resonance method") and a method using image processing (imaging) (hereinafter referred to as an "imaging method"). In this embodiment, it is possible to use either one of these alone or both in combination.

Note that in a case where reading is performed by the imaging method in the present invention, it is preferable to use a frequency band of 10 GHz to 3 THz in order to increase the information amount. In addition, in a case where reading is performed by the resonance method, it is preferable to use a frequency band of 0.1 GHz to 15 GHz in order to increase the information amount.

Although not illustrated, in the resonance method, identification information is determined on the basis of a difference in resonance frequency. The resonance frequency is determined by the shape (typically length) of a portion of metal serving as an antenna included in chipless RFID. Typically, if the maximum length of the antenna is ½λ of the frequency of an emitted wave, the antenna resonates, and an absorption peak is present where the intensity (amplitude) of a reflected wave with the frequency corresponding to the antenna length is low. In addition, by changing ambient environment of the antenna, such as a combination of permittivity and thickness of a base, a reflection peak can also be present where the intensity of the reflected wave is, on the contrary, increased. In the system of the resonance method, for example, antennas (portions of metal) have different resonant frequencies among RFID tags. In this case, if a tag reader sweeps the frequency of an emitted wave and radiates the electromagnetic wave to the tag, it is possible to read identification information corresponding to a spectrum of a reflected wave. Note that, regarding the resonance method, the following description is about a case where an absorption peak is present, unless otherwise specified.

In an example of this embodiment, chipless RFID in which a plurality of antennas (portions of metal) having different resonance frequencies are arranged in an array form is used. Similarly, also in this case, if a tag reader sweeps the frequency of an emitted wave and radiates the electromagnetic wave to the tag, reference waves are obtained, and the number thereof corresponds to the number of antennas. Thus, in this case, a single tag can hold a larger amount of information.

On the other hand, in the imaging method, a pattern based on arrangement of the metal section and the electromagnetic wave absorber is visualized as an image, and identification information corresponding to the image pattern is determined.

Figure 2A:
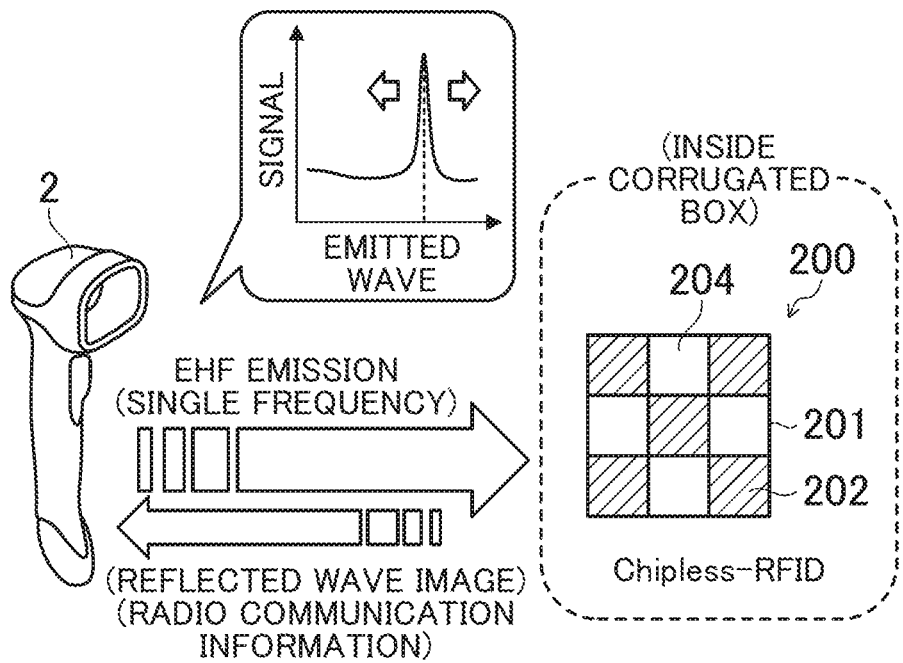
FIG. 2A illustrates a case where an electromagnetic wave is radiated to an RFID tag from a tag reader and FIG. 2B illustrates an electromagnetic wave reflected from the RFID tag.
Figure 2B:
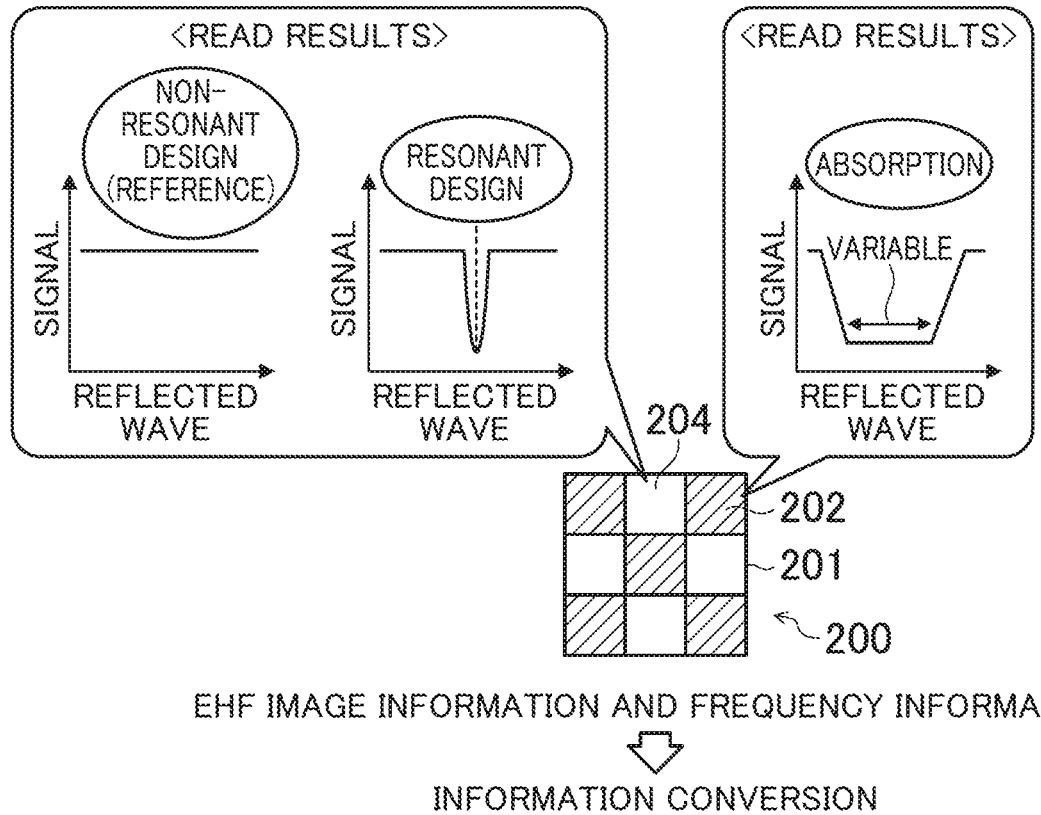

Referring to FIG. 2 (FIGS. 2A and 2B), an outline of an RFID tag system in a case of using the imaging method will be described. As illustrated in FIG. 2A, the RFID tag system of the imaging method is a system in which tag reader 2 reads a pattern image formed on a surface of RFID tag 200 and identification information.

RFID tag 200 is a chipless contactlessly readable tag without an IC chip, in which a plurality of members with different electromagnetic wave reflectances are arranged in a pattern associated with the identification information.

Herein, the electromagnetic wave reflectance is a ratio between energy of an emitted electromagnetic wave and energy of an electromagnetic wave that returns by reflection on the tag. The ratio can be measured by, for example, measuring the value of $S_{11}$, $S_{22}$, or $S_{21}$ of S parameter by using a vector network analyzer. More specifically, a tag is disposed 10 cm away from an electromagnetic wave emitter/receiver, and an electromagnetic wave that is emitted from the emitter to the tag and received by the receiver is analyzed by the vector network analyzer, and thus, the value of $S_{11}$, $S_{22}$, or $S_{21}$ can be measured, and the electromagnetic wave reflectance can be measured.

In a case of using the above measurement method, it is desirable that electromagnetic wave reflectances differ by 20% or more among members having different electromagnetic wave reflectances. By using the members whose electromagnetic wave reflectances differ by 20% or more, it is easy to identify (determine) members being different from each other and indicating information items (e.g., 0 and 1) different from each other.

In RFID tag 200 illustrated in FIG. 2, on a surface of plate-like base (base) 201, electromagnetic wave absorbers 202 and metal sections 204 are arranged in an arrangement pattern associated with identification information.

Electromagnetic wave absorber 202 can absorb energy of an electromagnetic wave. Electromagnetic wave absorber 202 has such a property as to and attenuate the energy of the electromagnetic wave when the electromagnetic wave is reflected thereon or transmitted therethrough. Examples of materials having such a property include a magnetic body, a conductive material, carbon, inorganic particles, a metal thin wire, resin, and the like. In addition, electromagnetic wave absorber 202 may be a composition formed of the above members, or resin, paper, or the like in which the above members are dispersed. In addition, electromagnetic wave absorber 202 may be a member having a water-absorbing property using a property of water to absorb electromagnetic waves. Furthermore, without the above members, electromagnetic wave absorber 202 may be any configuration by which attenuation of the electromagnetic wave energy can be confirmed, and such a configuration may be, for example, paper, resin, or the like having a certain thickness or more.

Generally, electromagnetic wave absorber 202 includes a material having a property of absorbing energy of an emitted wave (electromagnetic wave with a frequency of 0.1 GHz to 3 THz), which will be described later.

More specifically, electromagnetic wave absorber 202 has a property of converting the emitted electromagnetic wave into heat energy or canceling the energy by using a phase of the electromagnetic wave. Typically, types of radio wave absorber having such a property can be roughly classified into "magnetic absorber", "λ/4 type absorber", and "dielectric absorber".

The above three types of absorbers will be generally described below. The "magnetic absorber" is a magnetic body alone or a magnetic body that is present in a nonmetal composition, and absorbs a radio wave on the basis of a phenomenon that a magnetic moment of the magnetic body (micro magnet) does not change the orientation with respect to an external magnetic field with a high frequency (equivalently becomes electric resistance). In addition, the "λ/4 type absorber" is a radio wave absorber in which a resistive film (e.g., ITO film or resistive cloth) having a predetermined resistance (surge impedance of a plane wave) is provided from a metal plate with a spacer interposed therebetween, and absorbs a radio wave by the resistive film being irradiated with an electromagnetic wave. The λ/4 type absorber is called in this manner because the radio wave absorption rate is the highest when the resistive film is provided at a position away from the metal plate by λ/4 (λ is the wavelength of the electromagnetic wave). The "dielectric absorber" is a dielectric material in which a resistive material is dispersed in a lossless dielectric, and absorbs a radio wave in the following manner. The dielectric material is irradiated with an electromagnetic wave, and thereby current flows in the dielectric material to generate heat, and as a result, energy of the electromagnetic wave is converted into heat energy.

Furthermore, a photonic crystal may also be used for electromagnetic wave absorber 202. To the photonic crystal, a typically known photonic crystal is applicable. The photonic crystal is a periodic structure, in which a phenomenon called a photonic bandgap occurs. In the photonic bandgap, only a wavelength that corresponds to the period is diffracted, and an electromagnetic wave with a particular frequency is prohibited from being propagated in the structure. By using this phenomenon, electromagnetic wave absorber 202 can be a structure in which energy of the electromagnetic wave in a particular frequency band is lost within the photonic crystal.

The photonic crystal is roughly classified into a one-dimensional photonic crystal, a two-dimensional photonic crystal, and a three-dimensional photonic crystal. Any of these may be used in this embodiment.

The one-dimensional photonic crystal has a periodic structure only in one direction and corresponds to what is called a dielectric multilayer film in the related art. The dielectric multilayer film is a one-dimensional photonic crystal formed in a direction perpendicular to a substrate by stacking films formed of two or more types of materials in order. Besides, there is a silicon substrate on which a periodic trench is dug by using vertical etching on silicon, for example.

The two-dimensional photonic crystal has a periodic structure in two directions, that is, on a plane, and typically has a periodic structure on a plane parallel to a substrate. In this case, since no periodic structure is present in a direction perpendicular to the substrate, the thickness of an element needs to be larger than a light wavelength. In the two-dimensional photonic crystal, the structure of the photonic bandgap changes depending on a light polarization state. The light polarization state includes a transverse electric (TE) wave perpendicular to an electric field and a transverse magnetic (TM) wave perpendicular to a magnetic field, and the TE wave and the TM wave often have largely different characteristics. The two-dimensional photonic crystal may have particular characteristics by intentionally disorganizing the regularity of the crystal. For example, in a two-dimensional photonic crystal, a row is removed to form a line defect, and thereby a waveguide with a size of smaller than or equal to a wavelength can be formed, and transmission/absorption characteristics of an electromagnetic wave can be changed.

The three-dimensional photonic crystal has a periodic structure in all three XYZ-axis directions. Characteristics of the three-dimensional photonic crystal include that both the TE wave and the TM wave have a photonic bandgap for light of a certain wavelength. This is called a complete photonic bandgap. The three-dimensional photonic crystal can be formed by periodically forming a dielectric with a 3D printer or the like, by integrating fine resin beads in a self-organized manner, or the like. In addition, a photonic crystal using resin microparticles with common particle diameters can also be fabricated. In this case, since the gaps are coupled, a liquid is poured into the gaps and is solidified, and then the resin beads are melted, so that the structure can be reversed.

The three-dimensional photonic crystal can also be fabricated by stacking films each having a two-dimensional photonic crystal structure so as to shift by 90°. In addition, the three-dimensional photonic crystal can also be fabricated by forming a recess/protrusion structure on a substrate in advance and alternately stacking two types of films thereon. Furthermore, the three-dimensional photonic crystal can also be fabricated by direct exposure using holography.

In this embodiment, as electromagnetic wave absorber 202, any of the above can be used alone or in combination. For example, on a surface of metal base 201, a type of the above-described various materials or radio wave absorbers is arranged as electromagnetic wave absorbers 202, and, for example, by changing the containing amount of a magnetic body or a resistive material among electromagnetic wave absorbers 202, an electromagnetic wave absorption rate can be made different. Alternatively, on a surface of metal base 201, different materials or different types of radio wave absorbers may be arranged as electromagnetic wave absorbers 202, and an electromagnetic wave absorption rate can be made different among the different types. With such a configuration, different information can be held in each of electromagnetic wave absorbers 202.

For simplicity, in RFID tag 200 illustrated in FIG. 2, on a surface of base 201 having a substantially square planar shape, electromagnetic wave absorbers 202 and metal sections 204 having a smaller square planar shape are alternately arranged in a checkerboard pattern. On the other hand, the shape of base 201 and the shape and number of electromagnetic wave absorbers 202 and metal sections 204 are arbitrary, and by changing these, different identification information can be configured. The material for forming base 201 serving as a base is also arbitrary, and specific structure examples will be described later. In addition, in order to easily identify (determine) electromagnetic wave absorber 202 and metal section 204 being patterns or information items (e.g., 0 and 1) that are different from each other, it is desirable that electromagnetic wave reflectances thereof differ by 20% or more.

Furthermore, base 201, electromagnetic wave absorber 202, and metal section 204 may have arbitrary thicknesses. On the other hand, the thickness of electromagnetic wave absorber 202 may influence the electromagnetic wave absorption rate of electromagnetic wave absorber 202. In other words, by changing the thickness of electromagnetic wave absorber 202 to change the electromagnetic wave absorption rate, different identification information can be configured. Herein, in a case where the thickness is changed to indicate different information (e.g., 1 or 2), it is desirable that such a thickness be set that electromagnetic wave reflectances thereof differ by 20% or more. In addition, in a case where the $\lambda/4$ type absorber is used as electromagnetic wave absorber 202, in order to increase the electromagnetic wave absorption rate, it is desirable that the thickness of electromagnetic wave absorber 202 be ¼ wavelength of the emitted wave, which will be described later.

As a method for forming (arranging) electromagnetic wave absorber 202 and metal section 204 on base 201, various methods can be used. In an example, using ink (or toner) containing a magnetic body, electromagnetic wave absorber 202 is formed by patterning the ink (or toner) on base 201 by an inkjet printer (or an electrophotographic printer). In addition, for example, using ink (or toner) containing silver nanoparticles, metal section 204 is formed by patterning the ink (or toner) on base 201 by an inkjet printer (or an electrophotographic printer). Such a method has effects of making a reflection state of the electromagnetic wave (emitted wave) on metal section 204 stable and reducing misreading of data formed (recorded) on RFID tag 200. In addition, for user on demand, it is preferable to pattern (print by patterning) electromagnetic wave absorber 202 and metal section 204 by inkjet printing, which is a printing method with a high on-demand performance. Electromagnetic wave absorber 202 and metal section 204 may be patterned not only on base 201 but also on various goods, such as a packing material, a container, and a product.

Hereinafter, with reference to FIGS. 2A and 2B, a principle for reading identification information by the imaging method will mainly be described. In this embodiment, an electromagnetic wave (emitted wave) with a predetermined frequency (wavelength) is output from tag reader 2 and radiated to RFID tag 200. Herein, the electromagnetic wave being the emitted wave (see FIG. 2A) has a wavelength in the range of radio waves or infrared rays, and specifically, an electromagnetic wave with a frequency from 10 GHz to 3 THz (SHF-EHF-far-infrared) is used.

The electromagnetic wave (emitted wave) in such a band has characteristics of extremely high straightness (low diffusibility), directivity, easiness in high-gain antenna design, and the like. Thus, as illustrated in the characteristic diagram in FIG. 2A, it is relatively easy to design the configuration of an electromagnetic wave emitter (hereinafter simply referred to as an "emitter") in tag reader 2 such that a peak of signal intensity is at a single frequency.

Because of the above characteristics, according to this embodiment, even in a case where RFID tag 200 is provided inside nonmetal goods, such as a corrugated box, the emitted wave output from the emitter can be transmitted through the goods. That is, the emitted wave (electromagnetic wave) output from the emitter can be radiated to a surface of RFID tag 200 through goods, such as a corrugated box, and the electromagnetic wave (reflected wave) reflected on RFID tag 200 can be transmitted through the goods again and then received by a receiver.

In the upper part of FIG. 2B, characteristic graphs of electromagnetic waves reflected from an RFID tag is illustrated. In each graph, the vertical axis represents the signal intensity of a reflected wave, and the horizontal axis represents the frequency of a reflected wave. As is found in the characteristic graph in the upper left of FIG. 2B, if a portion of metal section 204 on a surface of RFID tag 200 is designed as a non-resonator for which the above-described absorption peak is not present, regardless of the frequency of the emitted wave, the reflected wave has high signal intensity. On the other hand, if metal section 204 is designed as a resonator for which an absorption peak is present, as illustrated in the characteristic diagram in the middle of FIG. 2B, in the portion of metal section 204, the reflected wave has low intensity (small amplitude) at a particular frequency. In addition, in a portion of electromagnetic wave absorber 202, as is found in the characteristic graph in the upper right, the reflected wave has low intensity at a particular frequency or in a particular frequency band.

Herein, the frequency width at which the signal intensity in electromagnetic wave absorber 202 is low can be made wider than that in a case of a resonator (see each characteristic graph). Thus, it is relatively easy to design a region of metal section 204 that is made as a resonator and a region of electromagnetic wave absorber 202 in an identifiable manner. On the other hand, in order to make it easier to identify (i.e., to prevent misidentification) the region of metal section 204 that is made as a resonator and the region of electromagnetic wave absorber 202, as will be described later, the resonant frequency of metal section 204 that is made as a resonator is preferably shifted from a predetermined reference frequency (i.e., frequency band in which the electromagnetic wave is absorbed by electromagnetic wave absorber 202).

In addition, in a case where electromagnetic wave reflectances are made different by changing the types or thicknesses of electromagnetic wave absorbers 202, the signal intensity of the reflected wave differs between electromagnetic wave absorbers 202. Thus, from a magnitude pattern of the received reflected wave, tag reader 2 determines an arrangement pattern of electromagnetic wave absorbers 202, and on the basis of the determined arrangement pattern, reads identification information configured in RFID tag 200.

More specifically, regarding the received reflected wave, tag reader 2 reads the magnitude pattern of the reflected wave in accordance with the position on a surface of RFID tag 200 as electromagnetic wave reflection information, converts the electromagnetic wave reflection information into image information (image in a checkerboard pattern in the example in FIG. 2), and reads identification information from the generated image information. Note that details of the configuration and processing of tag reader 2 will be described later.

According to this embodiment having such a configuration, various benefits can be obtained as described below.

Hereinafter, technical benefits according to this embodiment will be described in comparison with the related art as appropriate.

[Increase in Capacitance for Identification Information]

The above method for radiating an electromagnetic wave to a tag formed by patterning metal ink and reading a diffraction signal is for determining a pattern shape on a surface of the tag and reading identification information configured in the tag. Thus, it is difficult to configure different identification information by changing the thickness of the pattern on the surface of the tag, for example.

In contrast, according to this embodiment in which identification information of a tag is read on the basis of contrast or the like of a reflected electromagnetic wave, it is possible to change an electromagnetic wave absorption rate, that is, a degree of contrast, on the basis of the type, thickness, or the like of an electromagnetic wave absorber arranged on a surface of the tag in addition to a pattern shape on the surface of the tag. In addition, according to this embodiment, it is also possible to design the electromagnetic wave absorption rate of the electromagnetic wave absorber to be less than 100% and to record a degree of phase deviation of a reflected wave. Thus, with RFID tag 200 according to this embodiment, by configuring different identification information even with the same pattern shape, the capacitance can be increased. Furthermore, as will be described later, by forming a tag configuration using deviation of a resonance frequency, such as a tag on which a plurality of members having different resonance frequencies are arranged and in which information of each resonance frequency is associated with identification information, the capacitance can be further increased.

[Readability in Case of Radiating Emitted Wave in Diagonal Direction of Tag]

With the above method for reading a pattern shape of a tag by using an electromagnetic wave diffraction phenomenon, it is necessary to radiate an electromagnetic wave right from the front of the tag in order to correctly read the pattern shape of the tag, and unfortunately, the reading operation is troublesome. That is, in a case where the electromagnetic wave from a reader is not radiated right from the front of the tag, a degree of diffraction changes, which leads to misreading. Thus, unfortunately, it has been difficult to maintain a wide radiation angle of the emitted wave for the tag.

In contrast, according to this embodiment using reflection and absorption characteristics of an electromagnetic wave, by a property of the electromagnetic wave in the above-described band, even in a case where an emitted wave is radiated in a diagonal direction of RFID tag 200, a reflected wave with a small loss can be obtained. In addition, also in a case where a surface of RFID tag 200 is made rough so that the emitted wave has a wide reflection angle, that is, where the surface of RFID tag 200 is structured in a distraction reflection manner, the loss of the reflected wave due to the distraction can be relatively reduced. Thus, in a contactlessly readable tag system according to this embodiment, it is easy to maintain a wide radiation angle of the emitted wave for RFID tag 200, and the reading operation can be made easy.

[Maintaining Readable Distance]

As described above, in a case of a barcode tag of the related art, it is necessary to bring a barcode reader close to the barcode in a few centimeters. In addition, also in a method for reading a pattern shape of a tag by using an electromagnetic wave diffraction phenomenon, in order to obtain a diffraction signal with sufficient intensity, it is necessary to bring the reader close to the tag.

In contrast, according to this embodiment using reflection and absorption characteristics of an electromagnetic wave, even if an electromagnetic wave transmitter/receiver is away from RFID tag 200 by a few tens of centimeters or more, it is possible to detect a difference in an electromagnetic wave reflection pattern and to read identification information configured in the tag.

[Transmission Property through Shielding Object]

With a barcode tag of the related art, printed content is read on the basis of contrast of a printed pattern of the barcode by radiating visible light. Accordingly, if a shielding object is present between the barcode reader and the tag, the printed pattern becomes unreadable. In addition, also in a method for reading a pattern shape of a tag by using an electromagnetic wave diffraction phenomenon, if there is a shielding object between the reader and the tag, a degree of diffraction changes, which leads to misreading of the printed content.

In contrast, according to this embodiment using reflection and absorption characteristics of an electromagnetic wave, even if a shielding object is present between an electromagnetic wave emitter/receiver and RFID tag 200, it is possible to transmit the electromagnetic wave through the shielding object to detect a difference in an electromagnetic wave reflection pattern and to read identification information configured in the tag. Furthermore, according to this embodiment, by attaching RFID tag 200 inside a corrugated box, a package, or the like utilizing the transmission property of the electromagnetic wave through a shielding object, for example, it is possible to enhance privacy protection, prevention of rewriting of the tag, and the like.

[Resistance to Disturbance such as Static Electricity or Vibrations]

An RFID tag of the related art on which an IC chip is mounted has the following issues, for example. Since the IC chip is easily affected by a disturbance, such as static electricity or vibrations, the recorded content of the tag may change or become unreadable because of breaking of a circuit, for example, depending on the type of goods to which the tag is attached, logistics environment, or the like.

In contrast, according to this embodiment for reading a pattern of a tag and identification information by using reflection and absorption characteristics of an electromagnetic wave, since the tag can be created without an IC chip, it is possible to increase resistance to a disturbance, such as static electricity or vibrations. Thus, according to this embodiment, regardless of the type of goods to which RFID tag 200 is attached, logistics environment, or the like, it is possible to detect a magnitude pattern of a reflected electromagnetic wave and to read identification information configured in the tag.

[Readability when Attached to Metal Goods]

As described above, if an RFID tag of the related art on which an IC chip is mounted is attached to metal goods, it is likely that wireless communication between the IC chip and a transmitter/receiver is hindered, and it is difficult to maintain high readability. In addition, also in a method for reading a pattern shape of a tag formed by patterning metal ink on a base by using an electromagnetic wave diffraction phenomenon, if the tag is attached to metal goods, contrast is difficult to obtain in a diffraction signal received by a reader. Thus, it is difficult to correctly determine the pattern shape of the tag, thereby decreasing readability of identification information configured in the tag.

In contrast, as illustrated in FIG. 2, in a form in which electromagnetic wave absorber 202 is arranged in a pattern on RFID tag 200, even if RFID tag 200 is attached to metal goods, it is possible to maintain contrast (see FIG. 2B) of the emitted wave reflection pattern between the portion of electromagnetic wave absorber 202 and the portion of metal (metal section 204 and metal goods). More specifically, in a case where the size of metal section 204 is designed with no resonance (non-resonant design), as is found from the characteristic graph illustrated in the upper left of FIG. 2B, an extremely strong reflection signal is present in any frequency band. In addition, in a case where the size of metal section 204 is designed such that a resonance frequency is present in the same band (resonant design), strong absorption is present only at the particular resonance frequency, and a strong reflection signal is present in the other frequency bands. Thus, according to the embodiment illustrated in FIG. 2, even in a case where RFID tag 200 is attached to metal goods, it is possible to correctly determine the pattern shape of the tag, and further, to maintain readability of identification information configured in RFID tag 200 at a high accuracy. In addition, according to this embodiment, it is possible to form RFID tag 200 on metal goods.

[Applicability to Inkjet Printing Method]

In the above method for reading a diffraction signal by radiating an electromagnetic wave to a tag formed by patterning metal ink, it is not possible to obtain a high conductivity as a result of influence of ink additives or the like. Thus, it is difficult to obtain a diffraction signal with sufficient intensity, and a reader needs to be brought close to the tag. Here, in order to increase the conductivity, a thick-film metal pattern may be formed. However, in a case of a thick film, it is difficult to apply an inkjet printing method with a high on-demand performance. Furthermore, since metal ink tends to lead to head clogging by alternation of metal particles, for example, it is difficult to apply an inkjet printing method.

In contrast, in RFID tag 200 according to this embodiment, even if electromagnetic wave absorber 202 is a relatively thin film, it is possible to make the electromagnetic wave reflectance thereof different from the electromagnetic wave reflectance of metal base 201 by 20% or more. In addition, in this embodiment, since highly stable pigment ink, such as a magnetic body or carbon particles, can be used as ink for forming (printing) electromagnetic wave absorber 202, there is almost no influence of alternation or the like. Thus, according to this embodiment, it is possible to print electromagnetic wave absorber 202 by an inkjet printing method and to meet various user demands quickly.

Note that the printing method used for manufacturing RFID tag 200 is not limited to a particular method, and various other printing methods can be applied, such as electrophotography using toner.

In the example of RFID tag 200 illustrated in FIGS. 2A and 2B, the arrangement pattern of the portions of metal and electromagnetic wave absorbers 202 has a symmetry shape in the vertical and horizontal directions. Thus, it is difficult to determine the vertical and horizontal directions of RFID tag 200, that is, a reference direction. In order to cope with such an issue, for example, it is preferable to make the above arrangement pattern asymmetry or to use (determine in advance) electromagnetic wave absorber 202 at a particular position or having a particular shape as a reference point section for position detection. Herein, a plurality of reference point sections are preferably provided on the tag in order to more accurately detect the orientation (and further, inclination or the like) of RFID tag 200.

Next, an example of an RFID tag and system will be described with reference to FIG. 3. The RFID tag is read by a method combining the above-described resonance method and imaging method.

Hereinafter, different portions from those of the RFID tag illustrated in FIG. 2 will mainly be described. In RFID tag 200 illustrated in FIG. 3, metal sections 204 are arranged on base 201, and electromagnetic wave absorbers 202 in the upper right and lower left corners are replaced with resonance shift materials 203 (203A and 203B). Resonance shift materials 203 are designed in advance to shift a resonance frequency of metal sections 204. In the example illustrated in FIG. 3, with resonance shift material 203A in the upper right corner and resonance shift material 203B in the lower left corner on a surface of the tag, covered metal sections 204 are configured to resonate with electromagnetic waves with frequencies that are different from each other (e.g., 57 GHz and 60 GHz).

Figure 3:
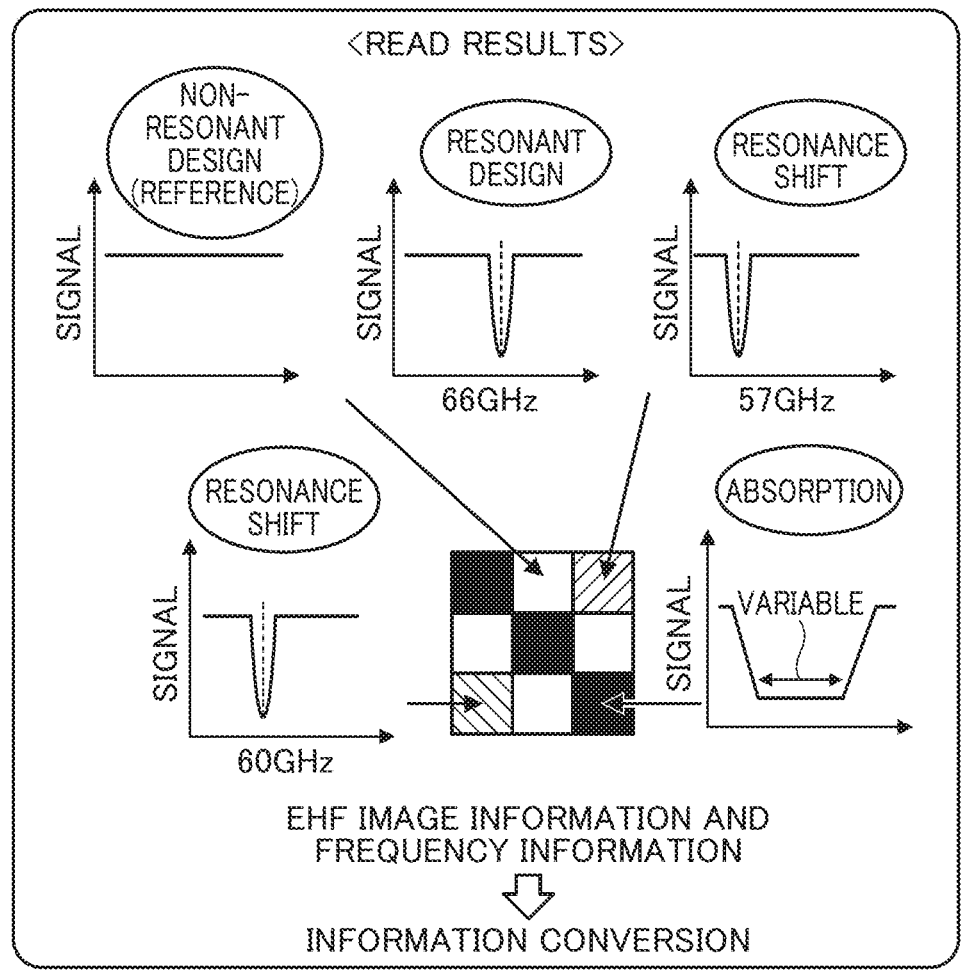
FIG. 3 illustrates an outline of a method for reading a tag in the above RFID system by further using resonance frequency information.
Figure 3:
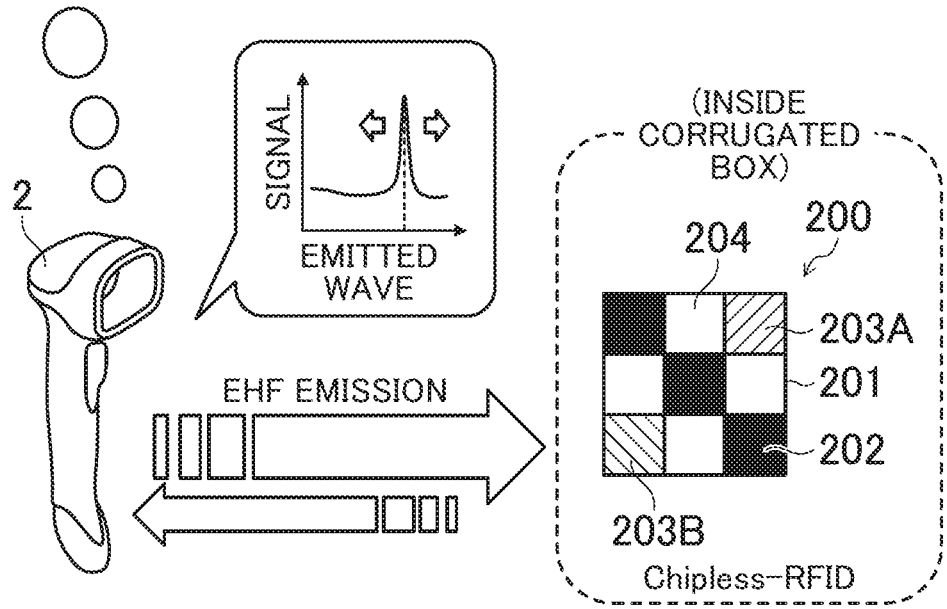

Since the RFID tag has such a structure, as illustrated in the upper part of FIG. 3, during reading of the tag, in regions of resonance shift material 203A and resonance shift material 203B, different reflection characteristics from those of the other regions can be obtained. In this example, frequency sweep is set such that the emitted wave to be radiated from tag reader 2 includes a domain of 57 to 66 GHz. If this emitted wave is radiated from tag reader 2, as illustrated in FIG. 2B, in a case where the size of portion of metal in metal sections 204 is designed to have a resonance frequency in the above sweep band (66 GHz in the drawing), a strong absorption peak is measured at the particular frequency. On the other hand, in a case where the size of portion of metal in metal sections 204 is designed to not have a resonance frequency in the above sweep band, no absorption peak is present in a reflected wave. In addition, almost no reflected wave is measured from electromagnetic wave absorbers 202. Furthermore, in this case, the regions of resonance shift materials 203 (203A and 203B) do not resonate with the electromagnetic wave of the 66 GHz band, and no absorption peak is measured in this band. Then, by sweeping the frequency of the emitted wave to be radiated from tag reader 2 as appropriate, as illustrated in FIG. 3, an absorption peak at 57 GHz and an absorption peak at 60 GHz are detected from resonance shift material 203A and resonance shift material 203B, respectively.

That is, regions of resonance shift materials 203 (203A and 203B) on base 201 serve as resonance shift sections that resonate at different frequencies from a reference resonance frequency.

Thus, by detecting the reflected wave, tag reader 2 can easily determine the regions of metal sections 204, the regions where electromagnetic wave absorbers 202 are arranged, and the regions of resonance shift materials 203 (203A and 203B) on base 201 as being different pattern elements from one another. Therefore, with the RFID tag according to this embodiment, the capacitance can be further increased.

Next, various structure examples of the RFID tag according to this embodiment will be described.

Figure 4:
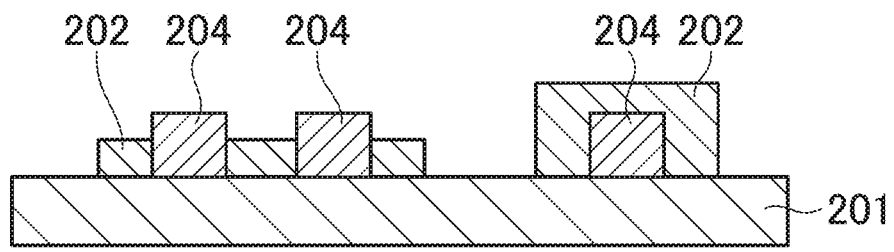
FIG. 4 is a sectional view illustrating a structure example of the RFID tag according to this embodiment.

FIG. 4 illustrates a sectional shape of the RFID tag according to this embodiment. In this example, on plate-like base 201 having a substantially rectangular planar shape, electromagnetic wave absorbers 202 and metal sections 204 are arranged.

For base 201, a material having an electromagnetic wave transmitting property is used. Examples of such a material include paper, resin, and the like. In various structure examples illustrated and described below, a material that transmits an electromagnetic wave (emitted wave) is used for base 201, unless otherwise specified.

Figure 5:
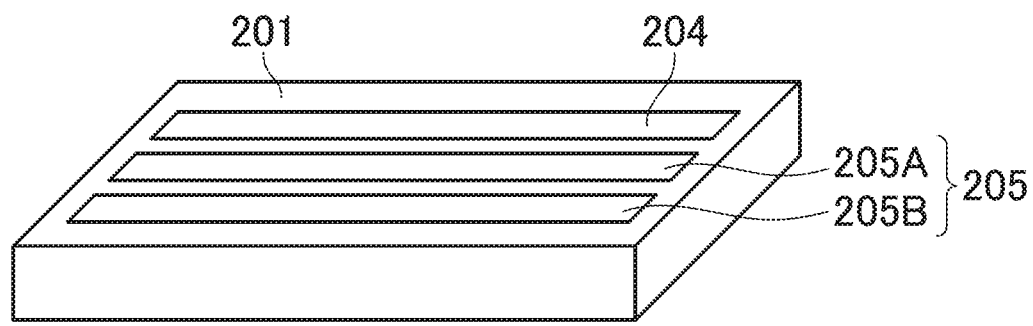
FIG. 5 is a perspective view illustrating another structure example of the RFID tag according to this embodiment.

Plural (three) metal sections 204 are provided and each extend in the same shape and in the same direction (direction of paper) (see FIG. 5, as appropriate). These metal sections 204 serve as part of an image pattern and also serve as resonance antennas (and furthermore, the above-described resonance shift sections).

In the example illustrated in FIG. 4, electromagnetic wave absorbers 202 are arranged at two portions: right side and left side in the drawing. Specifically, electromagnetic wave absorber 202 is provided so as to entirely cover metal section 204 on the right side. In addition, electromagnetic wave absorbers 202 are provided along side surfaces of two metal sections 204 on the left side so as to expose top surfaces of these two metal sections 204.

Herein, electromagnetic wave absorber 202 provided so as to cover metal section 204 on the right side plays a role of absorbing the radiated electromagnetic wave and also plays a role of changing electromagnetic wave reflection characteristics of relevant metal section 204. That is, as compared with two metal sections 204 on the left side, metal section 204 on the right side covered with electromagnetic wave absorber 202 outputs a reflected wave with lower intensity (amplitude) than that of the radiated electromagnetic wave. In addition, metal section 204 on the right side can output a reflected wave whose phase is shifted from that of the radiated electromagnetic wave. Furthermore, metal section 204 on the right side covered with electromagnetic wave absorber 202, while having the same shape as that of two metal sections 204 on the left side, can also have a different resonance frequency from a resonance frequency of two metal sections 204 on the left side.

With such a structure, by radiating the electromagnetic wave to a surface of the tag, identification information held in the tag can be read by using both the above-described imaging method and resonance method.

For simplicity, FIG. 4 illustrates an example in which three metal sections 204 having the same shape are used. On the other hand, the number of metal sections 204 to be used is arbitrary, and metal sections 204 may have shapes different from each other. In addition, part of plural metal sections 204 may be used as the above-described reference point for position detection.

Next, another structure example of the RFID tag according to this embodiment will be described with reference to the perspective view in FIG. 5. In this example, on base 201 identical with that in the example in FIG. 4, one metal section 204 and two compositions 205 (205A and 205B) are provided. Herein, compositions 205 are obtained by mixing metal and an electromagnetic wave absorber. In addition, composition 205A and composition 205B have different mixed ratios of the metal and the electromagnetic wave absorber.

As compared with metal section 204, compositions 205 (205A and 205B) output a reflected wave with lower intensity (amplitude) than that of the radiated electromagnetic wave. In addition, compositions 205 (205A and 205B) can output a reflected wave whose phase is shifted from that of the radiated electromagnetic wave. Furthermore, compositions 205 (205A and 205B), while having the same shape as that of metal section 204, can have a different resonance frequency from a resonance frequency of relevant metal section 204. Thus, in this structure example, the mixed ratio of the metal and the electromagnetic wave absorber in compositions 205 (205A and 205B) can be associated with identification information held in the tag.

With such a structure, by radiating the electromagnetic wave to a surface of the tag, the identification information held in the tag can be read by using both the above-described imaging method and resonance method.

Figure 6:
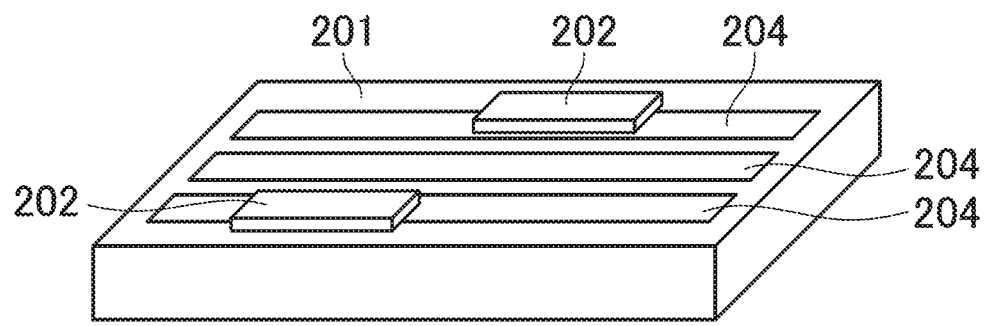
FIG. 6 is a perspective view illustrating another structure example of the RFID tag according to this embodiment.

Next, another structure example of the RFID tag according to this embodiment will be described with reference to the perspective view in FIG. 6. The RFID tag illustrated in FIG. 6 illustrates an example of a form in which at least part of electromagnetic wave absorber 202 is provided on metal section 204. In this example, on base 201 identical with that in the example in FIG. 4, plural (three) metal sections 204 identical with those in the example in FIG. 4 are provided, and two electromagnetic wave absorbers 202 are provided so as to cover part of metal sections 204.

More specifically, as illustrated, two electromagnetic wave absorbers 202 have substantially the same shape and are shorter than metal sections 204. In addition, electromagnetic wave absorber 202 on the front side of the drawing is provided on a left-side portion of metal section 204 on the front side of the drawing in the length direction. On the other hand, electromagnetic wave absorber 202 on the back side of the drawing is provided on a portion slightly right from the center of metal section 204 on the back side of the drawing in the length direction.

As compared with metal section 204 on which electromagnetic wave absorber 202 is not provided, regions where electromagnetic wave absorbers 202 are provided in two metal sections 204 above output a reflected wave with lower intensity (amplitude) than that of the radiated electromagnetic wave. In addition, the regions where electromagnetic wave absorbers 202 are provided in metal sections 204 can output a reflected wave whose phase is shifted from that of the radiated electromagnetic wave. Furthermore, metal sections 204 on which electromagnetic wave absorbers 202 are provided have substantially a shorter length, and thereby the resonance frequency thereof can be different (resonance shift sections) from the resonance frequency of metal section 204 on which electromagnetic wave absorber 202 is not provided. Thus, in this example, the positional relationship between metal sections 204 and electromagnetic wave absorbers 202 and a change in resonance frequency based on the positional relationship can be associated with identification information held in the tag.

With such a structure, by radiating the electromagnetic wave to a surface of the tag, the identification information held in the tag can be read by using both the above-described imaging method and resonance method.

Figure 7:
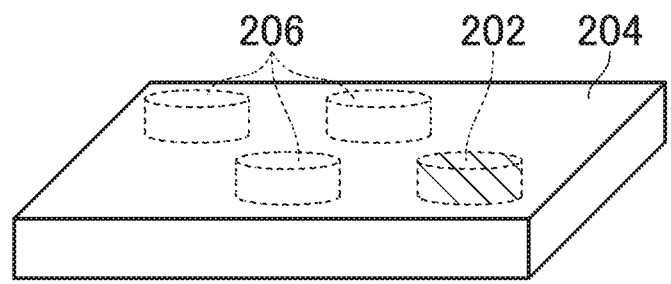
FIG. 7 is a perspective view illustrating another structure example of the RFID tag according to this embodiment.

Next, another structure example of the RFID tag according to this embodiment will be described with reference to the perspective view in FIG. 7. The RFID tag illustrated in FIG. 7 illustrates an example of a form in which plural resonance holes 206 for resonating the electromagnetic wave are provided in metal section 204 and in which electromagnetic wave absorber 202 described above is provided in any one or more of resonance holes 206. In the example illustrated in FIG. 7, metal section 204 also has a function of a base.

Herein, resonance holes 206 resonate with an emitted wave radiated from tag reader 2 and output a reflected wave. For simplicity, FIG. 7 illustrates a structure in which plural (four) resonance holes 206 having the same shape (e.g., diameter or depth) are provided and electromagnetic wave absorber 202 is provided in one of them. On the other hand, the number of resonance holes 206, the shape of each of resonance holes 206, and the like are arbitrary.

In this example, as compared with resonance holes 206 in which electromagnetic wave absorber 202 is not provided, resonance hole 20 in which electromagnetic wave absorber 202 is provided can change reflection characteristics (e.g., amplitude) of the reflected wave. Generally, in this example, arrangement (number or location) of electromagnetic wave absorber 202 with respect to plural resonance holes 206 can be associated with identification information held in the tag. In addition, the positional relationship between metal section 204 and resonance holes 206 and a change in electromagnetic wave reflection characteristics resulting from the shape or the like of each of resonance holes 206 can be associated with identification information held in the tag.

With such a structure, by radiating the electromagnetic wave to a surface of the tag, the identification information held in the tag can be read by using both the above-described imaging method and resonance method.

Figure 8:
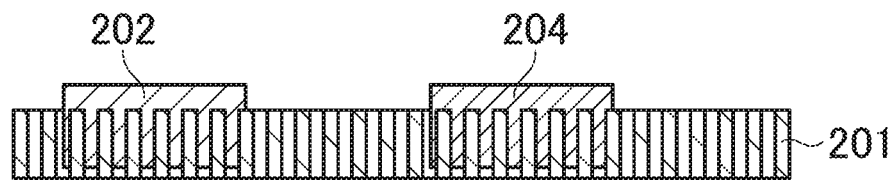
FIG. 8 is a sectional view illustrating another structure example of the RFID tag according to this embodiment.

Next, another structure example of the RFID tag according to this embodiment will be described with reference to the sectional view in FIG. 8. FIG. 8 illustrates an example of a form in which porous base 201 is used and metal section 204 and electromagnetic wave absorber 202 enter base 201 in the thickness direction. By using such porous base 201, for example, in a case where the tag is manufactured by inkjet printing, the thickness of metal section 204 and electromagnetic wave absorber 202 can be maintained.

The example illustrates a form in which ink containing metal (e.g., silver nanoink) and ink containing powder of the electromagnetic wave absorber are printed by an inkjet printer at different portions on base 201, and thereby both metal section 204 and electromagnetic wave absorber 202 penetrate into base 201. On the other hand, depending on a manufacturing method or the like, any one of metal section 204 and electromagnetic wave absorber 202 or only part thereof may penetrate into base 201 in the thickness direction.

Figure 9:
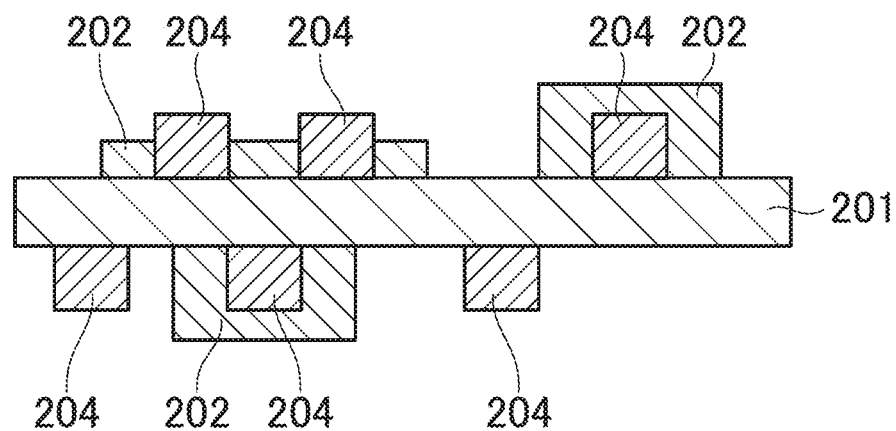
FIG. 9 is a sectional view illustrating another structure example of the RFID tag according to this embodiment.
Figure 10:
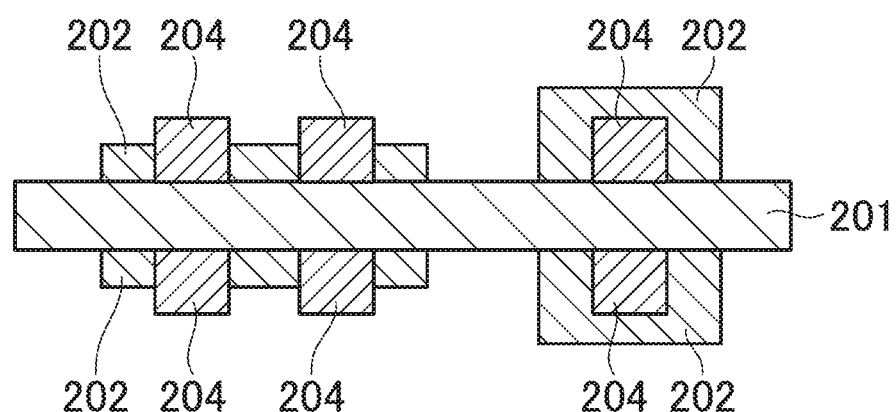
FIG. 10 is a sectional view illustrating another structure example of the RFID tag according to this embodiment.

Next, other structure examples of the RFID tag according to this embodiment will be described with reference to the sectional views in FIGS. 9 and 10. FIGS. 9 and 10 illustrate structure examples in which metal sections 204 and electromagnetic wave absorbers 202 are provided on both surfaces (top surface and back surface) of base 201.

Herein, FIG. 9 illustrates an example in which different recorded information (identification information and its accompanying information) is held on the top surface and the back surface of base 201. In the example illustrated in FIG. 9, metal sections 204 and electromagnetic wave absorbers 202 have the same pattern (arranging manner) as that in the example in FIG. 4 on the top surface of base 201 and has a different pattern from that on the back surface of base 201.

FIG. 10 illustrates an example in which the same identification information and the like are held on the top surface and the back surface of base 201. In the example illustrated in FIG. 10, metal sections 204 and electromagnetic wave absorbers 202 have the same pattern as that in the example in FIG. 4 on the top surface and the back surface of base 201.

With the structures in FIGS. 9 and 10, by utilizing a region on the back surface of base 201, the electromagnetic wave (emitted wave) emitted from tag reader 2 is reflected in a multiplex manner, for example. Thus, the SN ratio at the time of reading the tag can be increased, and capacitance of recorded information on the tag and reading accuracy can be increased.

Figure 11A:
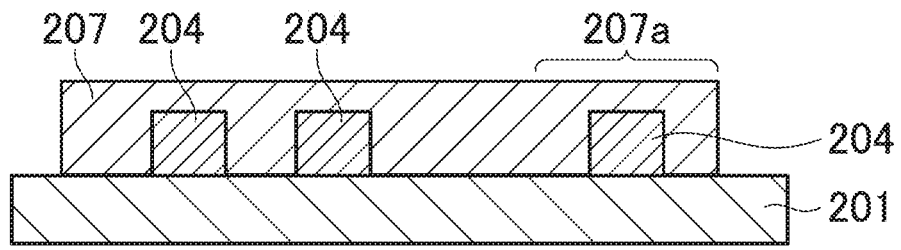
FIG. 11A illustrates a state before light radiation and FIG. 11B illustrates a state after light radiation to part of the tag.
Figure 11B:
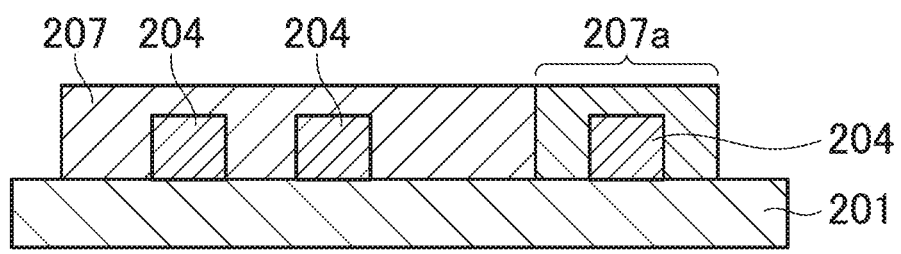

Next, another structure example of the RFID tag according to this embodiment will be described with reference to the sectional views in FIG. 11 (FIGS. 11A and 11B). FIG. 11A illustrates an example in which reactive member 207 is formed on base 201 and metal sections 204. Reactive member 207 has an electromagnetic wave absorbing property that changes by radiation of an electromagnetic wave (hereinafter simply referred to as "light") with a predetermined wavelength, such as a laser beam. In this example, reactive member 207 is a photosensitive layer and is provided on base 201 so as to cover all of plural metal sections 204. In the state illustrated in FIG. 11A, the electromagnetic wave absorbing property of reactive member 207 does not appear yet.

In this state, if light is radiated to a region 207a of arbitrary metal section 204 (entire single metal section 204 on the right side in this example), as illustrated in FIG. 11B, the electromagnetic wave absorbing property appears in the region 207a (hereinafter referred to as appearance region 207a). Thus, in the tag of this configuration example, by changing the position for radiating light to reactive member 207 or the like (i.e., arrangement of appearance region 207a or the like), different information can be held.

Figure 12:
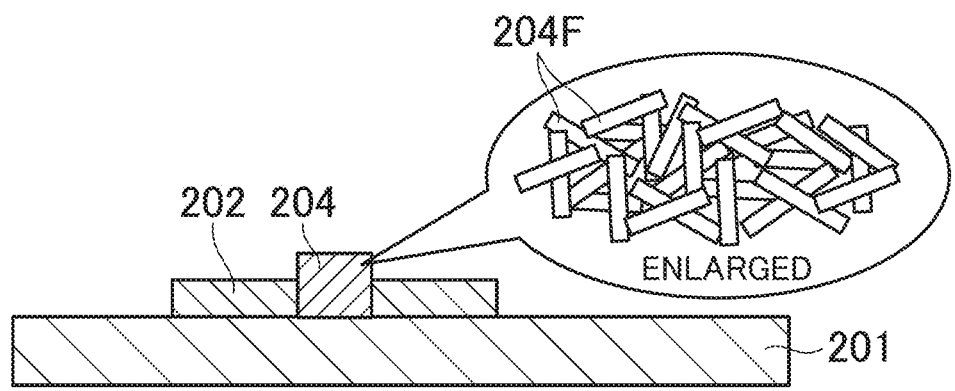
FIG. 12 is a sectional view illustrating another structure example of the RFID tag according to this embodiment and further illustrates a portion of metal in an enlarged manner.

Next, another structure example of the RFID tag according to this embodiment will be described with reference to the sectional view in FIG. 12. FIG. 12 illustrates an example in which metal section 204 includes plural metal flakes 204F whose long sides are oriented in isotropic directions, and illustrates an enlarged view of part of metal section 204.

Herein, metal flakes 204F have the same shape and are arranged such that the orientation thereof in the length direction is isotropic (at random). With such a structure, the range of readability of the tag can be increased, and the tag can be read not only in the direction facing a surface of base 201, but also in a diagonal direction. In addition, since the long sides have an equal length, it is possible to change the resonance frequency and to change a reflected wave signal.

Figure 13:
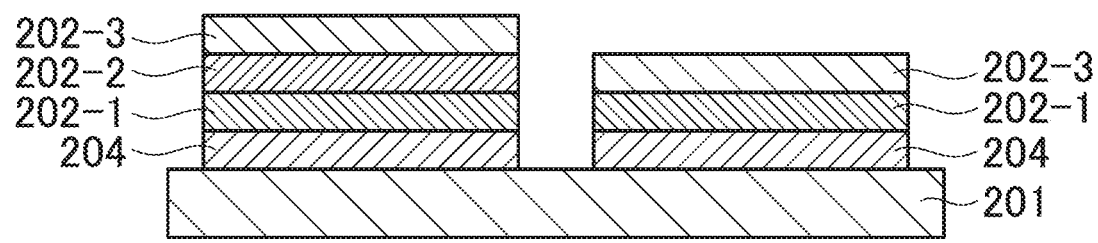
FIG. 13 is a sectional view illustrating another structure example of the RFID tag according to this embodiment.

Next, another structure example of the RFID tag according to this embodiment will be described with reference to the sectional view in FIG. 13. FIG. 13 illustrates an example in which plural (two in the illustrated example for simplicity) metal sections 204 are arranged on base 201, and electromagnetic wave absorbers 202-1 to 202-3 having different absorption frequency bands are stacked on metal sections 204. In this example, on metal section 204 on the left side, electromagnetic wave absorbers 202-1, 202-2, and 202-3 having different absorption frequency bands are stacked in this order. In an example, electromagnetic wave absorber 202-1 absorbs a 76-GHz electromagnetic wave, electromagnetic wave absorber 202-2 absorbs a 65-GHz electromagnetic wave, and electromagnetic wave absorber 202-3 absorbs a 57-GHz electromagnetic wave. On the other hand, on metal section 204 on the right side, electromagnetic wave absorbers 202-1 and 202-3 above are stacked in this order.

With such a structure, if an electromagnetic wave with a particular frequency that is determined in advance as above is radiated, intensity of reflected waves from metal sections 204 is decreased. In addition, in this example, the frequency of an electromagnetic wave at which intensity of a reflected wave is decreased is larger in number (three) in metal section 204 on the left side. With this structure example, by sweeping the frequency of an emitted wave by tag reader 2, for example, an information amount to be held in the tag (i.e., each metal section 204) can be increased.

Figure 14A:
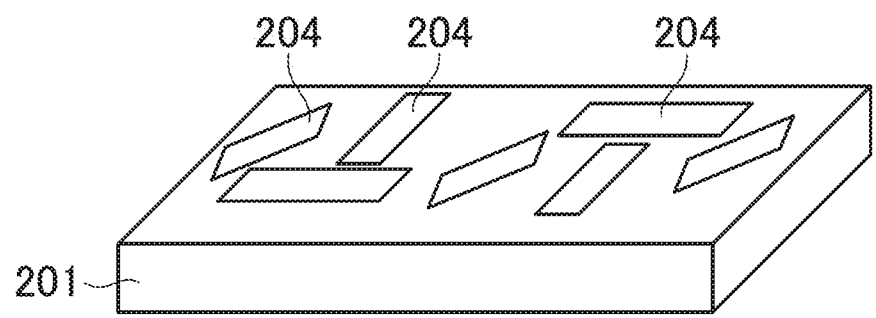
FIG. 14A illustrates a structure example in which seven metal sections (metal patterns) are arranged in a plurality of directions and FIG. 14B illustrates a state in which nine metal patterns are arranged.
Figure 14B:
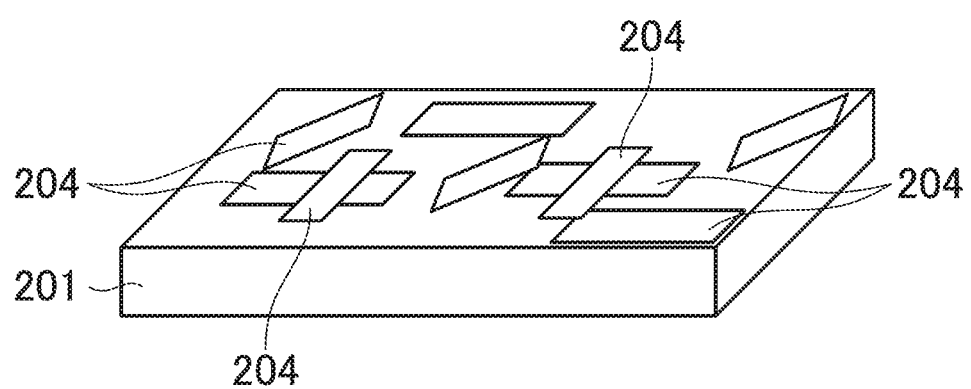

Next, other structure examples of the RFID tag according to this embodiment will be described with reference to the perspective views in FIG. 14 (FIGS. 14A and 14B). Although electromagnetic wave absorber(s) 202 is omitted from illustration in FIGS. 14A and 14B for simplicity, electromagnetic wave absorber(s) 202 can be provided at an appropriate position(s) as illustrated above in FIG. 4 and the like.

FIGS. 14A and 14B illustrate structure examples in which metal patterns (identification information) that respond electromagnetic waves in a plurality of polarized directions in the emitted wave of tag reader 2 are provided. In the example illustrated in FIG. 14A, on base 201, long sides of metal sections 204 (metal patterns) having the same shape are arranged to be oriented in various directions. Specifically, seven metal sections 204 are provided on base 201: three oriented in the same direction (diagonal direction); two oriented in the same lateral direction; and the other two oriented in the same vertical direction.

In the structure illustrated in FIG. 14A, metal sections 204 are arranged to be separated from one other. As another example, as illustrated in FIG. 14B, metal sections 204 may be arranged in an overlapping manner.

With the configurations illustrated in FIGS. 14A and 14B, information that respond electromagnetic waves (emitted wave) in a plurality of polarized directions can be held in the tag, and an information amount to be held in the tag can be increased. In addition, the tag can also be read in a diagonal direction.

Figure 15:
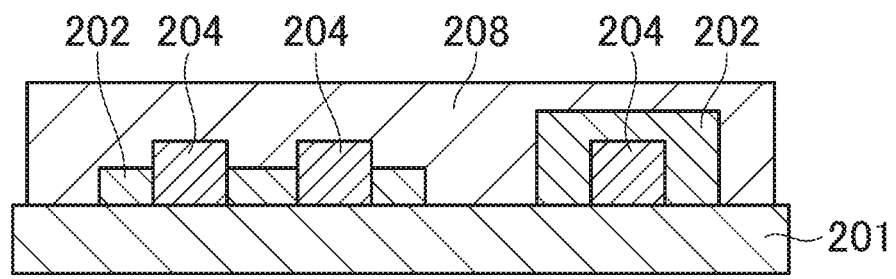
FIG. 15 is a sectional view illustrating another structure example of the RFID tag according to this embodiment.

Next, another structure example of the RFID tag according to this embodiment will be described with reference to the sectional view in FIG. 15. FIG. 15 illustrates an example of a structure in which protective layer 208 is stacked on a surface (surface on which metal sections 204 and electromagnetic wave absorbers 202 are provided) of base 201. The protective layer 208 protects metal sections 204 and electromagnetic wave absorbers 202. The example illustrated in FIG. 15 is based on a tag having the structure illustrated in FIG. 4, and the entire surface of base 201 is covered with protective layer 208 formed of a material that transmits an electromagnetic wave (emitted wave). Note that the material of protective layer 208 is not limited to a particular material as long as the material transmits an electromagnetic wave (emitted wave).

With such a structure, it is possible to prevent metal sections 204 and electromagnetic wave absorbers 202 from being damaged or degraded by durability, and further, it is possible to prevent the dynamic range (SN ratio) at the time of tag reading from being decreased.

Figure 16:
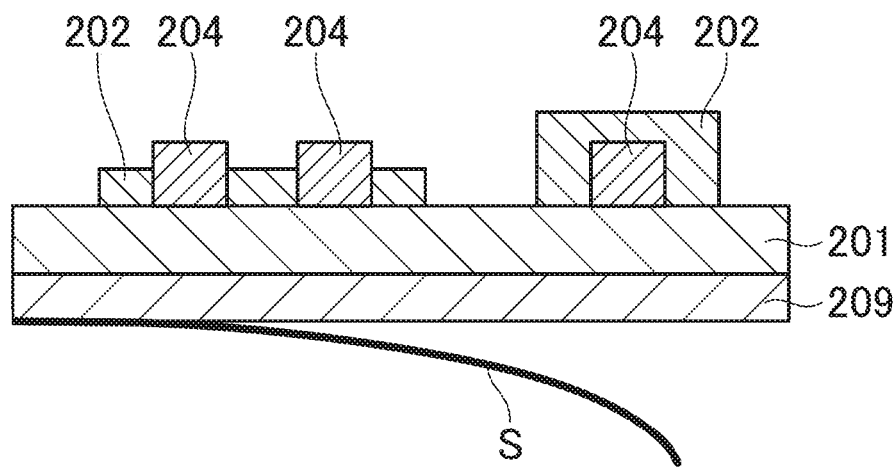
FIG. 16 is a sectional view illustrating another structure example of the RFID tag according to this embodiment.

Next, another structure example of the RFID tag according to this embodiment will be described with reference to the sectional view in FIG. 16. The tag illustrated in FIG. 16 is based on a tag having the structure illustrated in FIG. 4, and an example of a structure in which an adhesive section is provided on the back surface of base 201 is illustrated. The adhesive section is for attaching the tag onto an object such as goods. In this example, the adhesive section is adhesive layer 209 with a release sheet S.

With the RFID tag having such a structure, by releasing the release sheet S, adhesive layer 209 on the back surface of base 201 can be attached to various goods for use.

Next, another structure example of the RFID tag according to this embodiment will be described with reference to the sectional view in FIG. 17. FIG. 17 illustrates an example of a structure of the tag that holds different information according to the difference in the size of metal particles forming metal sections 204. As illustrated in FIG. 17 in an enlarged manner, metal particles forming metal section 204 on the left side are larger than metal particles forming metal section 204 on the right side. Because of the difference in the size of particles, metal section 204 on the left side and metal section 204 on the right side have different reflection characteristics if an emitted wave is radiated, and thus can hold different information. Furthermore, an information amount to be held in the tag can be increased.

Next, for example, a method for manufacturing the RFID tag according to this embodiment will be described with reference to enlarged views in FIG. 18 (FIGS. 18A and 18B). FIG. 18 illustrates a case where the above-described tag including metal flakes 204F illustrated in FIG. 9 is manufactured by an electrophotographic printing method. FIG. 18A illustrates an enlarged view of metal-containing toner, and FIG. 18B illustrates an enlarged view of electromagnetic-wave-absorber-containing toner.

As illustrated in FIG. 18A, in the metal-containing toner, in resin 300 (particulate powder) as a material of the toner, metal flakes 204F that are smaller than the resin particles are mixed. On the other hand, as illustrated in FIG. 18B, in the electromagnetic-wave-absorber-containing toner, in resin 300 as a material of the toner, electromagnetic wave absorbers 202 that are smaller than the resin particles are mixed.

In an example, the metal-containing toner illustrated in FIG. 18A and the electromagnetic-wave-absorber-containing toner illustrated in FIG. 18B are contained in different toner bottles of an electrophotographic image forming apparatus. Then, the toner is printed (e.g., transferred and fixed) on different regions (see FIG. 12 or the like) on base 201 so as to form a predetermined pattern associated with identification information, and thereby tags holding different identification information can be manufactured.

Figure 19:
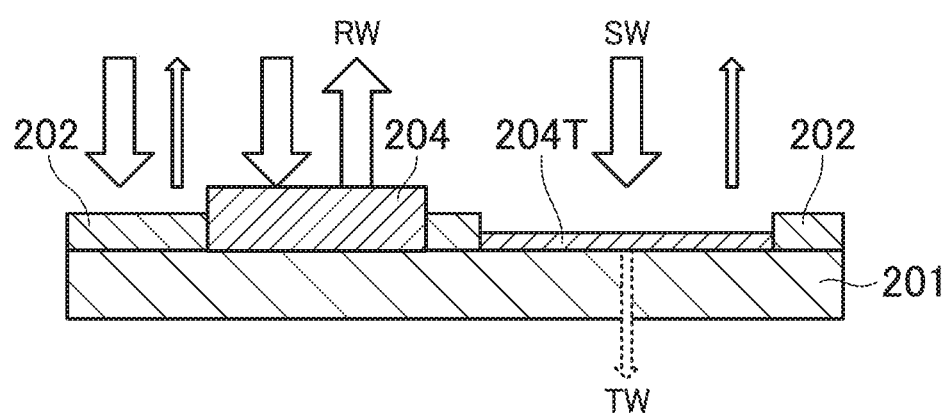
FIG. 19 is a sectional view illustrating another structure example of the RFID tag according to this embodiment

Next, another structure example of the RFID tag according to this embodiment will be described with reference to the sectional view in FIG. 19. FIG. 19 illustrates an example in which one of plural (two) metal sections 204 arranged on base 201 is formed as a thin film (metal thin film 204T) that transmits part of an electromagnetic wave. In addition, in the drawing, downward arrows with symbol SW denotes the electromagnetic wave (emitted wave) emitted from tag reader 2, and upward arrows with symbol RW denotes the electromagnetic wave (reflected wave) reflected on a surface of the tag. Herein, the thickness of each arrow represents the intensity of the electromagnetic wave.

As illustrated in FIG. 19, electromagnetic wave components of emitted wave SW emitted from tag reader 2 are absorbed in portions of electromagnetic wave absorbers 202, and thereby, reflected wave RW with low intensity returns to tag reader 2 from regions where electromagnetic wave absorbers 202 are arranged. In addition, emitted wave SW emitted from tag reader 2 is substantially totally reflected at a portion of metal section 204 on the left side of the drawing, and thereby, reflected wave RW with high intensity returns to tag reader 2 from the region. Furthermore, part of electromagnetic wave in emitted wave SW emitted from tag reader 2 is transmitted (see dotted arrow TW) through a portion of metal thin film 204T on the right side of the drawing, and thereby, reflected wave RW with low intensity returns to tag reader 2 from the region. Herein, the intensity, phase, and the like can be made different between the electromagnetic wave reflected from the regions where electromagnetic wave absorbers 202 are arranged and the electromagnetic wave reflected from the region where metal thin film 204T is arranged, and thus, it is possible to identify these regions or patterns being different from each other.

Thus, also with the structure example illustrated in FIG. 19, capacitance of recorded information on the tag can be increased.

Figure 20:
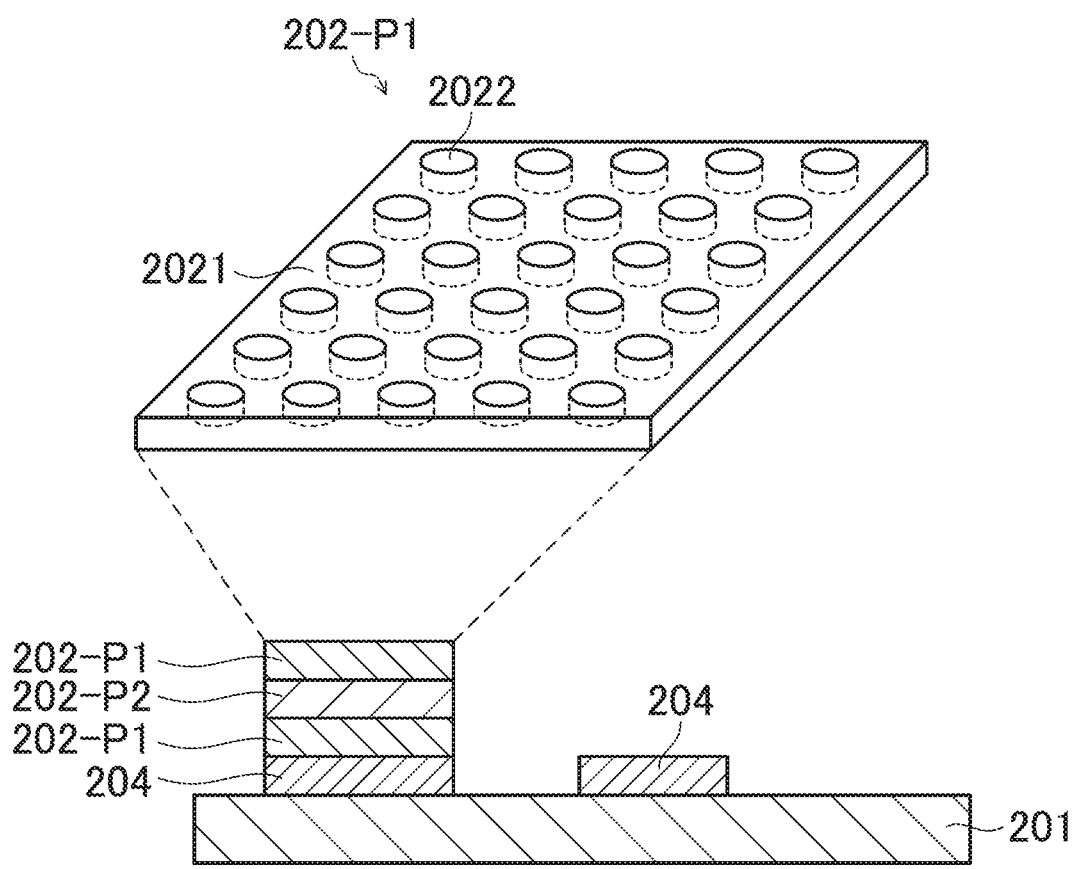
FIG. 20 is a sectional view illustrating another structure example of the RFID tag according to this embodiment and illustrates a layer of an electromagnetic wave absorber in an enlarged manner.
Figure 21:
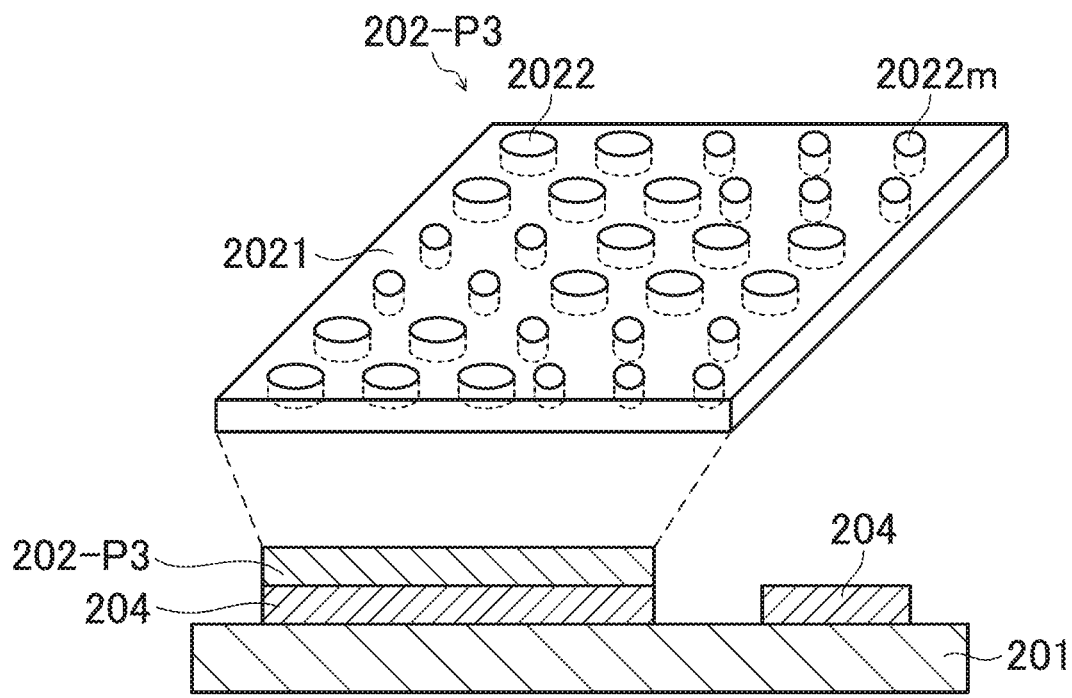
FIG. 21 is a sectional view illustrating another structure example of the RFID tag according to this embodiment and illustrates a layer of an electromagnetic wave absorber in an enlarged manner.
Figure 22:
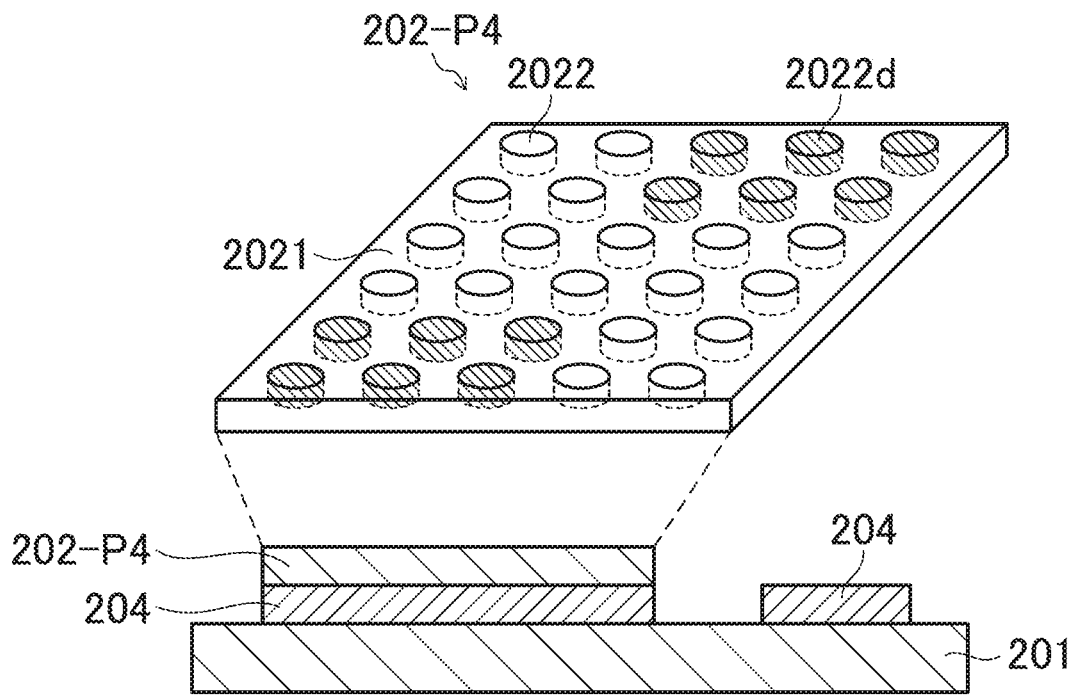
FIG. 22 is a sectional view illustrating another structure example of the RFID tag according to this embodiment and illustrates a layer of an electromagnetic wave absorber in an enlarged manner.

Next, other structure examples of the RFID tag according to this embodiment will be described with reference to FIGS. 20 to 22. FIGS. 20 to 22 illustrate structure examples using electromagnetic wave absorbers formed of the above-described photonic crystals.

In the tag illustrated in FIG. 20, metal sections 204 are stacked on base 201, and further, electromagnetic wave absorbers 202-P1, 202-P2, and 202-P1 are stacked on metal sections 204 (one of plural metal sections 204 is illustrated in the example). Electromagnetic wave absorbers 202-P1, 202-P2, and 202-P1 are formed of photonic crystals having a predetermined periodic structure pattern.

Herein, the periodic structure pattern or a refraction manner of the electromagnetic wave differs between electromagnetic wave absorber 202-P1 and electromagnetic wave absorber 202-P2. Specifically, as illustrated in the upper part of the drawing in an enlarged manner, in electromagnetic wave absorber 202-P1, in a surface of first composition material 2021, second composition materials 2022 are arranged in a pattern. Herein, first composition material 2021 and second composition material 2022 have different electromagnetic wave refractive indices.

In this example, first composition material 2021 is plate-like. In addition, second composition material 2022 has a substantially circular planar shape, and plural second composition materials 2022 are arranged to be embedded from a surface of first composition material 2021. Note that second composition materials 2022 may be voids. In addition, although the refractive index of first composition material 2021 is higher than the refractive index of second composition material 2022 in this example, the refractive index of first composition material 2021 may be lower than the refractive index of second composition material 2022.

Although electromagnetic wave absorber 202-P2 is substantially the same structure as electromagnetic wave absorber 202-P1 described above, first composition material 2021 or second composition material 2022 is a material having a different refractive index from that of electromagnetic wave absorber 202-P1. Alternatively, a diameter of second composition material 2022 in electromagnetic wave absorber 202-P2 is made different from a diameter of second composition material 2022 in electromagnetic wave absorber 202-P1.

With such a structure, the periodic structure pattern and the refraction manner of the electromagnetic wave can be made different between electromagnetic wave absorber 202-P1 and electromagnetic wave absorber 202-P2.

Thus, according to the difference in the type (e.g., periodic structure pattern) or the number of stacks of electromagnetic wave absorbers 202 formed of photonic crystals to be stacked on metal section 204, different information can be held.

For simplicity, FIG. 20 illustrates an example in which plural second composition materials 2022 arranged in first composition material 2021 are formed of the same material and have the same shape. On the other hand, second composition materials 2022 arranged in first composition material 2021 may be formed of different materials or have different shapes.

FIG. 21 illustrates an example of electromagnetic wave absorber 202-P3 formed of photonic crystals having a different periodic structure pattern from that of electromagnetic wave absorbers 202-P1 and 202-P2 described above. The illustrated example is similar in that plural second composition materials 2022 are arranged in a pattern in first composition material 2021 and is different in that the size (diameter or depth) of second composition materials 2022 is reduced at a predetermined portion (i.e., including composition materials 2022m having a smaller size).

FIG. 22 illustrates an example of electromagnetic wave absorber 202-P4 formed of photonic crystals having a different periodic structure pattern from that of electromagnetic wave absorbers 202-P1 and 202-P2 described above. This example is also similar in that plural second composition materials 2022 are arranged in a pattern in first composition material 202. On the other hand, in this example, second composition materials 2022 are composition materials 2022d formed of a different material at predetermined portions (12 portions: 6 in upper right and 6 in lower left in this example).

In the above manner, electromagnetic wave absorbers 202-P (P1 to P4) formed of photonic crystals having various periodic structure patterns are provided on metal section 204, and thus, different various kinds of information can be held.

Figure 23:
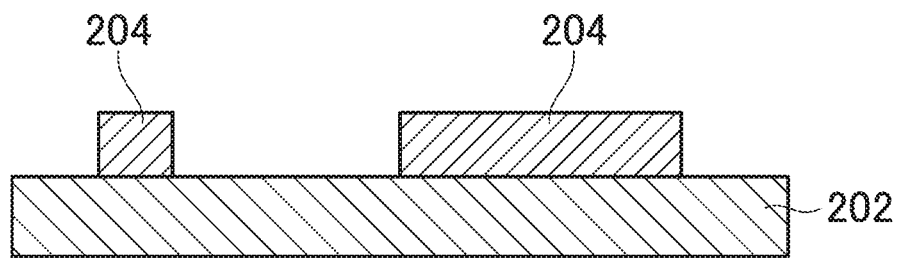
FIG. 23 is a sectional view illustrating another structure example of the RFID tag according to this embodiment.
Figure 24:
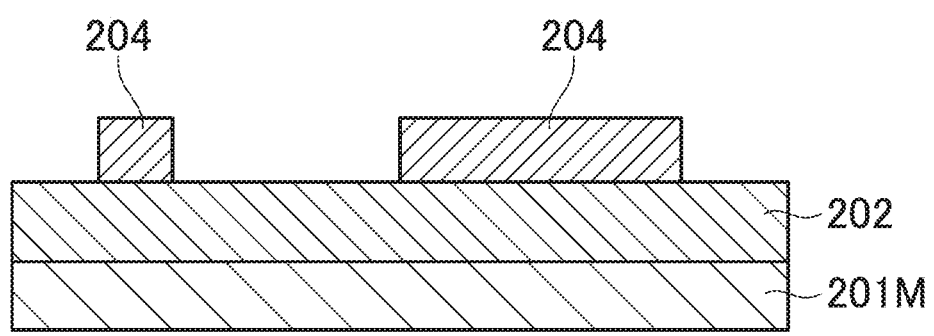
FIG. 24 is a sectional view illustrating another structure example of the RFID tag according to this embodiment.

Next, other structure examples of the RFID tag according to this embodiment will be described with reference to FIGS. 23 to 25. FIGS. 23 to 25 illustrate structure examples of a tag for preventing as many reflection characteristics noises, particular to an object (e.g., goods) to which the tag is to be attached, as possible.

In the above structure examples illustrated in FIG. 4 and the like, a case where base 201 has an electromagnetism transmitting property is assumed. In addition, in the structure example in FIG. 4, the region between electromagnetic wave absorbers 202 on the left side and electromagnetic wave absorber 202 on the right side is a gap. In a case of such a structure, depending on the property of goods or the like to which the tag is attached (typically, if goods or the like is metal), depending on the goods or the like, the electromagnetic wave is reflected on the goods or the like in the above gap region to become noise, and misreading may occur in tag reader 2 that receives the noise. In order to prevent such an issue, the structures illustrated in FIGS. 23 to 25 are preferably employed.

In the structure illustrated in FIG. 23, metal sections 204 are provided on plate-like electromagnetic wave absorber 202. That is, in this structure example, electromagnetic wave absorber 202 is a single body, and no gap is provided between plural electromagnetic wave absorbers 202 illustrated in FIG. 4. With such a structure, even in a case where the tag is attached to metal goods, it is possible to clearly distinguish an external form of the tag and a pattern of metal 204 provided on the tag from metal or the like located outside the tag.

In the structure illustrated in FIG. 24, based on the structure illustrated in FIG. 23, a metal base (metal substrate 201M) having the same shape as electromagnetic wave absorber 202 is provided (stacked) on a back surface of plate-like electromagnetic wave absorber 202. With the structure illustrated in FIG. 24, substantially the same effects as those of the structure in FIG. 23 can be obtained, and further, as compared with the structure illustrated in FIG. 23, a more stable reception signal can be obtained if the tag is attached to metal goods.

Figure 25A:
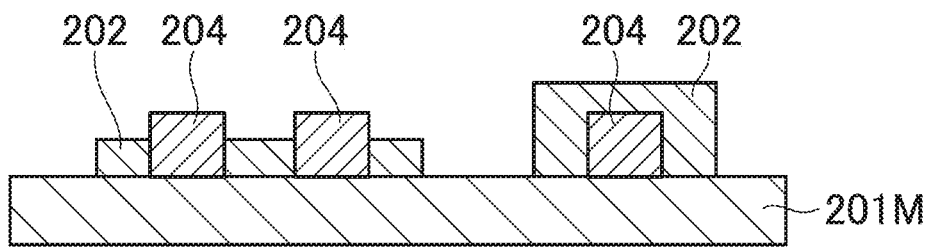
FIGS. 25A and 25B are sectional views illustrating other structure examples of the RFID tag according to this embodiment.

The structure illustrated in FIG. 25A illustrates an example in which, based on the structure illustrated in FIG. 4, base 201 having an electromagnetism transmitting property is replaced with metal substrate 201M. This structure example is obtained by making the structure illustrated in FIG. 4 more similar to the structure illustrated in FIG. 2, and the gap region between plural electromagnetic wave absorbers 202 is defined as part of a predetermined metal pattern. With such a structure, even in a case where the tag is attached to metal goods, it is possible to clearly distinguish an external form of the tag and a pattern of metal 204 provided on the tag from metal or the like located outside the tag.

Figure 25B:
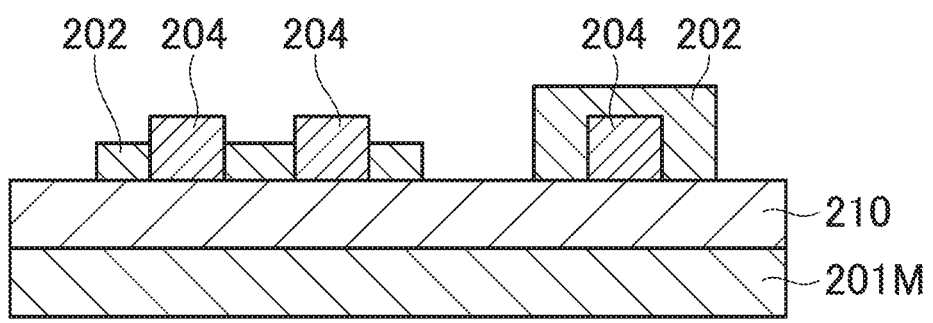

The structure illustrated in FIG. 25B illustrates an example in which, based on the structure illustrated in FIG. 4, base 201 having an electromagnetism transmitting property is replaced with dielectric layer 210 and metal substrate 201M. In this structure example, a metal layer (metal substrate 201M) is provided on the entire base serving as a base with dielectric layer 210 interposed therebetween, and thus, a resonance frequency can be output by using a space formed between metal section 204 on the top surface of dielectric layer 210 and base metal substrate 201M. In addition, since metal substrate 201M is provided on the entire base, substantially the same effects as those of the structure illustrated in FIG. 25A can be obtained, and reflection noise resulting from an object to which the tag is attached can be eliminated.

Figure 26A:
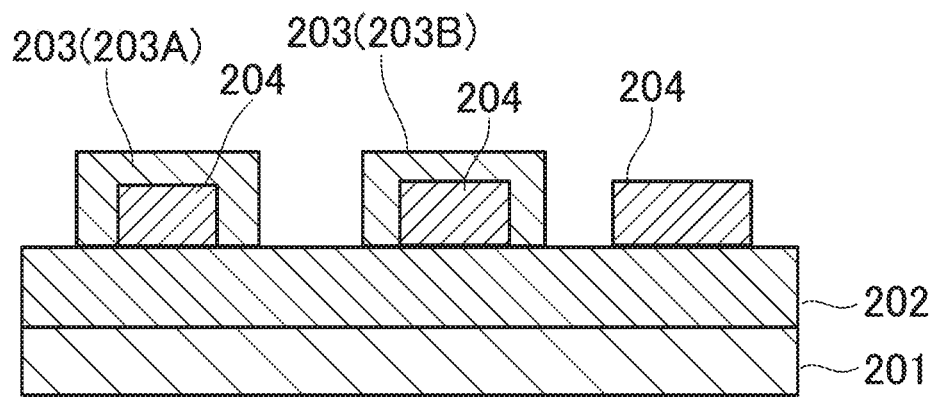
FIGS. 26A and 26B are sectional views illustrating other structure examples of the RFID tag according to this embodiment.
Figure 26B:
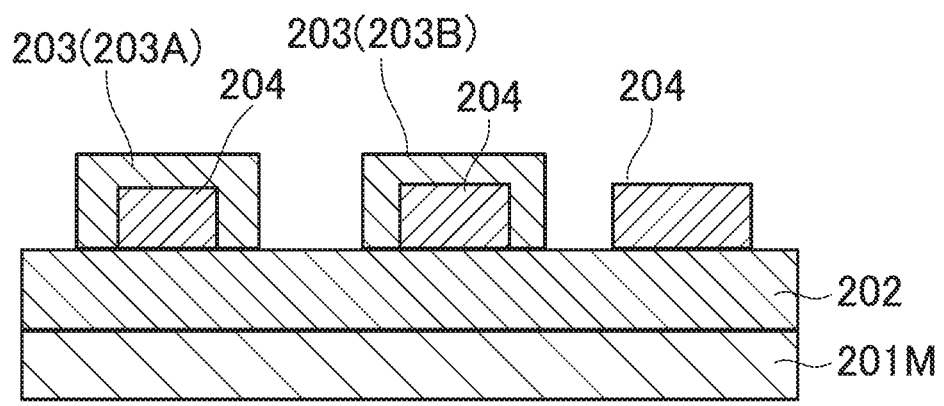

Structures illustrated in FIGS. 26A and 26B illustrate examples in which, based on the structure illustrated in FIG. 24, some patterns (herein, two out of three) of plural metal sections 204 provided on electromagnetic wave absorber 202 are covered with resonance shift materials 203 (203A and 203B). Herein, as illustrated above in FIG. 3 or the like, resonance shift material 203A and 203B resonate with electromagnetic waves with different frequencies. Thus, in these structure examples, regions of patterns of plural (three) metal sections 204 resonate with electromagnetic waves with different frequencies. In addition, by changing the height of resonance shift materials 203 (203A and 203B) that cover metal sections 204, the electromagnetic wave radiated from the tag reader can be reflected with phase deviation (shift) between metal sections 204 that are not covered with resonance shift materials 203. Furthermore, by changing a planar area of covering resonance shift materials 203, even with the same resonance shift material (203A, for example), different information can be held. Thus, with the RFID tag having such a structure, information to be recorded can be increased depending on a covering manner of resonance shift materials 203 (resonance shift section), and as compared with the structure illustrated in FIG. 23, a more stable reception signal can be obtained if the tag is attached to metal goods.

In the above description, various structure examples of the RFID tag (contactlessly readable tag) according to this embodiment have been described as plainly and generally as possible. On the other hand, the above various structure examples can be combined as appropriate.

Figure 27:
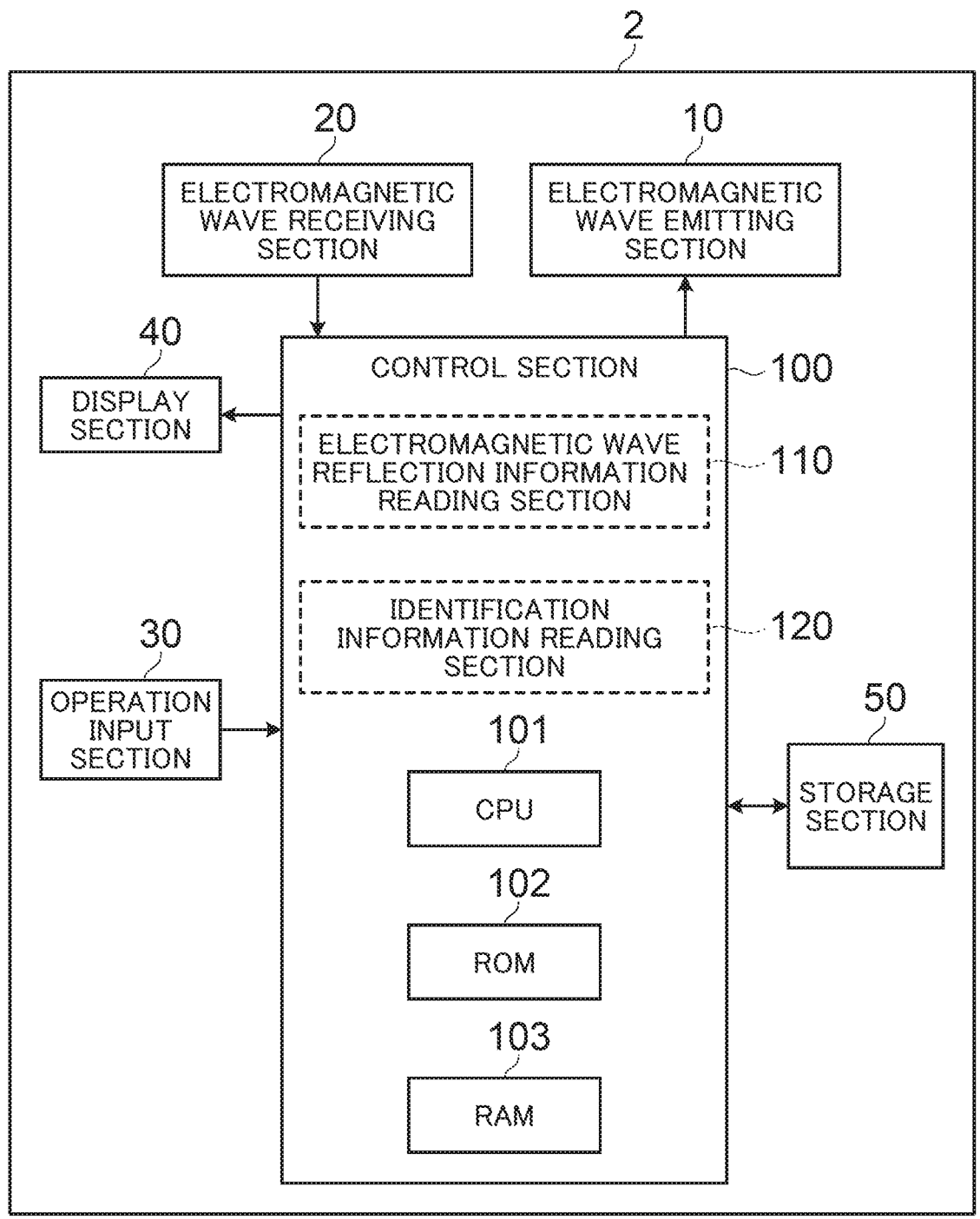
FIG. 27 is a block diagram illustrating a tag reader in this embodiment.
Figure 28:
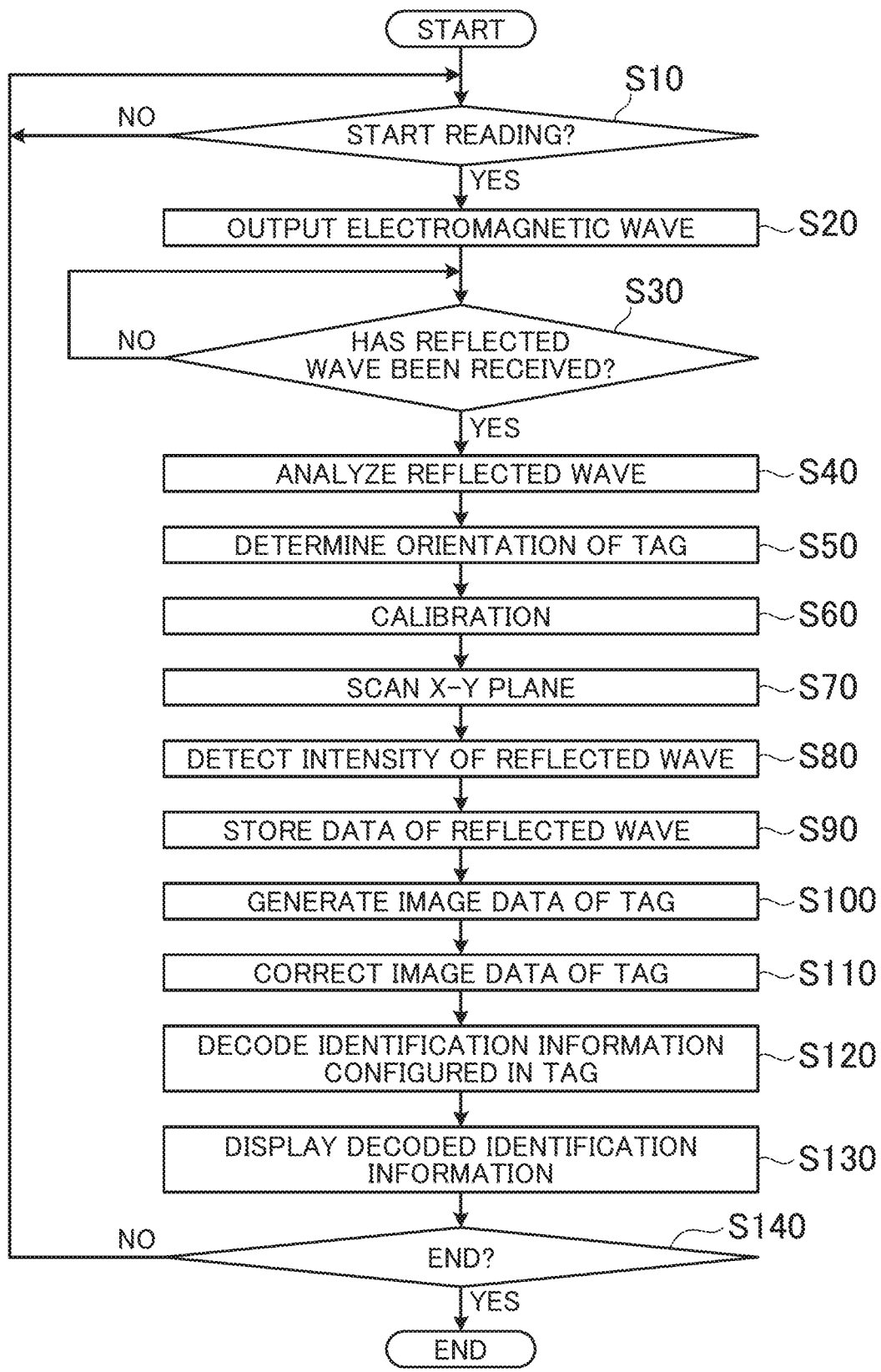
FIG. 28 is a flowchart for illustrating a process in which a control section of the tag reader executes reading of the tag by an imaging method.
Figure 29:
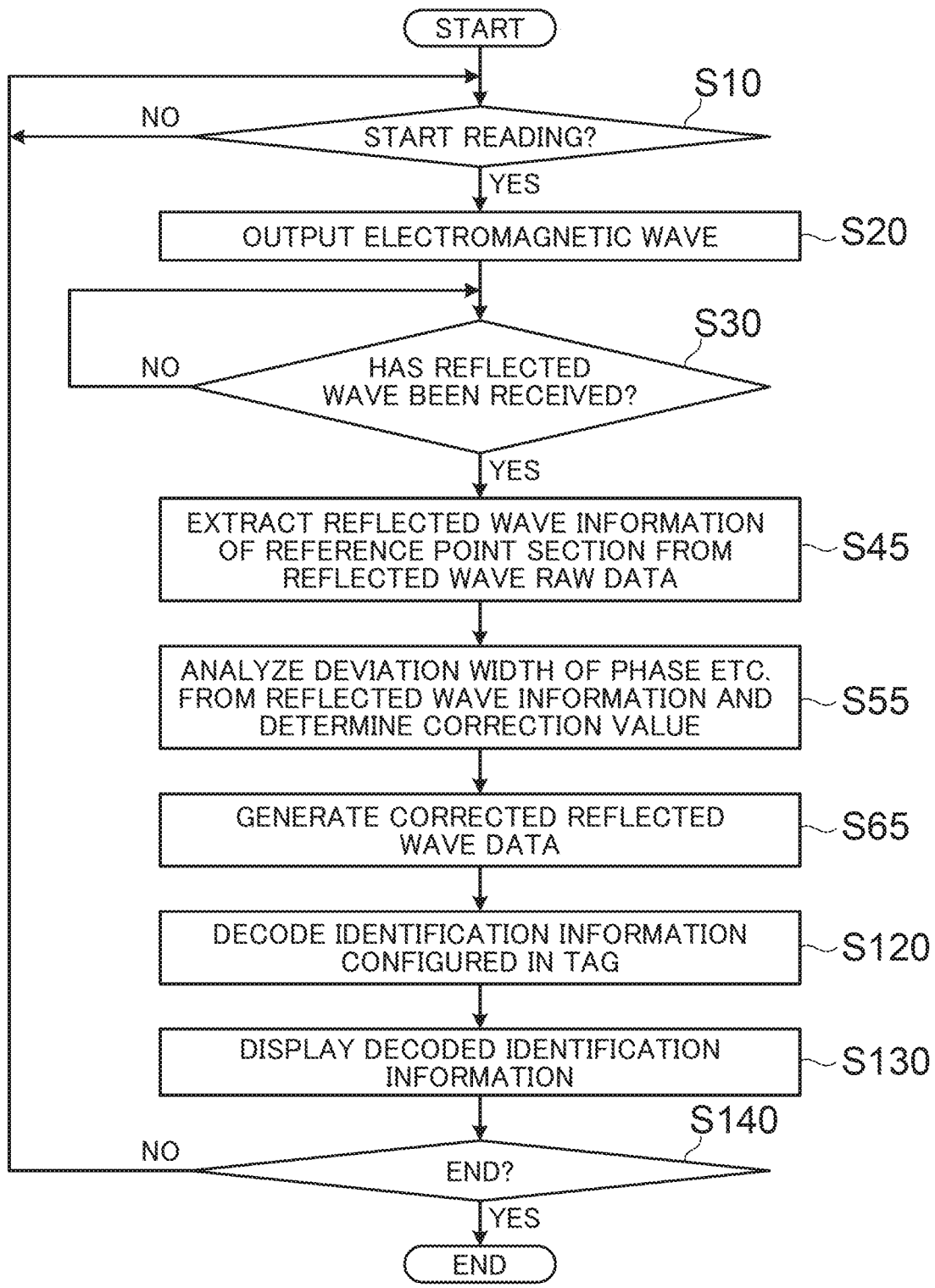
FIG. 29 is a flowchart for illustrating a process in which the control section of the tag reader executes reading of the tag by a resonance method.

Next, tag reader 2 and a contactlessly readable tag system for reading identification information configured in the above RFID tag will be described with reference to FIGS. 27 to 29.

The contactlessly readable tag system according to this embodiment includes an RFID tag and tag reader 2. The RFID tag is created from any of the above structures alone or in combination. On the basis of reflection characteristics of an electromagnetic wave reflected on the RFID tag, tag reader 2 determines identification information held in the tag.

Tag reader 2 has functions of a determination apparatus that determines identification information on the basis of an amplitude of an electromagnetic wave reflected on the RFID tag and a frequency shift or a phase shift. As illustrated in FIG. 27, tag reader 2 includes electromagnetic wave emitting section 10, electromagnetic wave receiving section 20, operation input section 30, display section 40, storage section 50, and control section 100, for example.

Electromagnetic wave emitting section 10 includes an electronic circuit for generating radio signals, an emission antenna, and the like and serves as an electromagnetic wave emitter that emits an electromagnetic wave with a predetermined frequency in the above range of 10 GHz to 3 THz (SHF-EHF-far-infrared).

Electromagnetic wave receiving section 20 includes a reception antenna, an electronic circuit, and the like and serves as a reflected wave receiver that receives a reflected wave signal of the electromagnetic wave emitted by electromagnetic wave emitting section 10. Electromagnetic wave receiving section 20 is provided at a position corresponding to a reflection angle of the electromagnetic wave on a surface of RFID tag 200. Electromagnetic wave receiving section 20 supplies the received reflected wave signal to control section 100.

A peak of reception sensitivity of electromagnetic wave receiving section 20 is at the same frequency as an emission frequency of electromagnetic wave emitting section 10 (see FIG. 2A and FIG. 2B). In this system, since the frequency (resonance frequency) of the reflected wave, which is reflected on the tag, is wide, the reception sensitivity of electromagnetic wave receiving section 20 corresponds to the frequency band of the reflected wave reflected on the tag. For example, in a case where the emitted wave is swept and emitted from electromagnetic wave receiving section 20, the reception sensitivity of electromagnetic wave receiving section 20 can be changed under control of control section 100 to be the same frequency of the swept emission frequency (see FIG. 3).

Operation input section 30 includes various switches (operation buttons), such as a power switch for switching on/off a main power supply and a radiation switch for outputting (radiating) the electromagnetic wave, and, in response to reception of a user's input operation, outputs an operation signal to control section 100.

Display section 40 is constituted by a liquid crystal display (LCD), for example. In accordance with a display control signal input from control section 100, display section 40 displays an operation screen or identification information configured in the RFID tag.

Control section 100 includes central processing unit (CPU) 101, read only memory (ROM) 102, random access memory (RAM) 103, and the like. CPU 101 reads a program corresponding to processing content from ROM 102, loads the program to RAM 103, and controls operations of blocks of tag reader 2 in cooperation with the loaded program. At this time, various types of data stored in storage section 50 are referred to. Storage section 50 is constituted by a non-volatile semiconductor memory (so-called flash memory) or a hard disk drive, for example.

In this embodiment, control section 100 serves as a determination section that determines identification information on the basis of an amplitude of an electromagnetic wave reflected on metal section 204 and electromagnetic wave absorber 202 of the RFID tag and a frequency shift or a phase shift. That is, control section 100 analyzes the reflected wave signal input from electromagnetic wave receiving section 20, and, on the basis of the analysis results, performs processing for decoding and displaying identification information configured in the RFID tag. More specifically, control section 100 detects a magnitude of an amplitude of the reflected wave input from electromagnetic wave receiving section 20 and a resonant frequency absorption peak or phase deviation as electromagnetic wave reflection information and determines identification information corresponding to the electromagnetic wave reflection information.

Herein, in a case where the above-described imaging method is used, control section 100 outputs an emitted wave with a reference frequency (e.g., 66 GHz) from electromagnetic wave emitting section 10 and generates image data of an RFID tag to be read on the basis of an amplitude (magnitude pattern) of a reflected wave input from electromagnetic wave receiving section 20. In order to generate the image data, control section 100 can refer to a phase of the reflected wave input from electromagnetic wave receiving section 20. Furthermore, control section 100 decodes identification information of the tag from the generated image data.

In addition, in a case where the above-described resonance method is used, control section 100 outputs an emitted wave with a reference frequency (66 GHz) from electromagnetic wave emitting section 10 and sweeps the frequency of the emitted wave as appropriate so as to identify a plurality of absorption peaks (resonance frequencies) at which an amplitude of a reflected wave input from electromagnetic wave receiving section 20 is the weakest. In order to identify the resonance frequencies, control section 100 can refer to a phase of the reflected wave input from electromagnetic wave receiving section 20. Furthermore, control section 100 decodes identification information of the tag from the identified plurality of resonance frequencies.

In this embodiment, by using both the imaging method and the resonance method as appropriate, control section 100 decodes the identification information of the tag. A processing example of both the methods will be described later with reference to flowcharts.

Thus, control section 100 serves as electromagnetic wave reflection information reading section 110 that reads reflection information of the emitted wave (electromagnetic wave reflection information) on the basis of characteristics (e.g., amplitude, phase, and resonance frequency) of the reflected wave of the electromagnetic wave (emitted wave) radiated on the RFID tag. Control section 100 also serves as identification information reading section 120 that reads the identification information configured in the tag on the basis of image information obtained from the read electromagnetic wave reflection information and deviation from reference values of the phase, resonance frequency, amplitude, and the like.

A way of using tag reader 2 in this embodiment will be briefly described. After electromagnetic wave emitting section 10 of tag reader 2 is oriented in the direction of RFID tag 200, when a radiation switch is pressed, the emitted wave (electromagnetic wave) with a predetermined frequency is output from electromagnetic wave emitting section 10 to irradiate RFID tag 200 (see FIG. 2A, for example). Then, the electromagnetic wave is reflected on RFID tag 200 and received by electromagnetic wave receiving section 20, various kinds of processing as above and as will be described later are performed, and thereby the identification information configured in RFID tag 200 is read and displayed on display section 40.

Hereinafter, flow of processing performed by control section 100 of tag reader 2 will be described with reference to flowcharts. Note that FIG. 28 indicates processing in a case of the above-described imaging method, and FIG. 29 indicates processing in a case of the above-described resonance method. In addition, substantially the same steps are denoted by the same reference numerals in FIGS. 28 and 29.

First, referring to FIG. 28, the processing in a case of the imaging method will be described. In step S10 after the power supply is turned on, control section 100 monitors input signals from operation input section 30 to determine whether the radiation switch (hereinafter simply referred to as a "switch") has been pressed. If control section 100 determines that the switch has not been pressed (step S10, NO), control section 100 goes back to step S10 and performs the determination again. On the other hand, if control section 100 determines that the switch has been pressed (step S10, YES), control section 100 proceeds to step S20.

In step S20, control section 100 outputs a control signal to electromagnetic wave emitting section 10 to output the above-described emitted wave (electromagnetic wave). Through this control, the electromagnetic wave with a predetermined reference frequency (66 GHz in this example) is output (radiated) from electromagnetic wave emitting section 10 toward the RFID tag.

In the subsequent step S30, control section 100 monitors signals input from electromagnetic wave receiving section 20 to determine whether a reflected wave of the output electromagnetic wave with the predetermined frequency has been received. If control section 100 determines that the reflected wave has not been received (step S30, NO), control section 100 goes back to step S30 and performs the determination again. On the other hand, if control section 100 determines that the reflected wave has been received (step S30, YES), control section 100 proceeds to step S40.

Subsequently, control section 100 analyzes the received reflected wave (step S40) and determines the orientation of the RFID tag (step S50). The orientation is determined by, for example, identifying the position of the above-described reference point provided on the tag. Subsequently, control section 100 performs calibration processing in accordance with the determined orientation of RFID tag 200 (step S60). The calibration processing is performed to set the value of reflectance of the electromagnetic wave reflected at the reference point section to a reference value (e.g., 0), for example.

Subsequently, in the received reflected wave, for a certain region (rectangular region having the reference point section as an end section in this example) in the direction of RFID tag 200, control section 100 scans a two-dimensional plane along the X-axis and its intersecting Y-axis (step S70). In addition, from the scanning results, control section 100 detects the intensity (magnitude pattern, see FIG. 2B) of the reflected wave corresponding to the region of RFID tag 200 (step S80).

In the subsequent step S90, control section 100 stores data of the detected reflected wave in storage section 50 and proceeds to step S100.

In step S100, control section 100 generates image data of RFID tag 200. In the subsequent step S110, control section 100 performs image correction processing in order to make the outline of the image clearer by, for example, edge processing or brightness correction. This processing makes clearer the contrast of the outline, brightness, tone, and the like between the portion of metal and the portion of electromagnetic wave absorber of RFID tag 200 to be read, and the image pattern can be recognized more accurately.

Subsequently, on the basis of the corrected image pattern, control section 100 decodes the identification information configured in RFID tag 200 (step S120), and performs control to display the decoded identification information on display section 40 (step S130).

Furthermore, control section 100 monitors signals input from operation input section 30 (step S140) to determine whether the above-described switch is no longer pressed. If control section 100 determines that the switch is still pressed (step S140, NO), control section 100 goes back to step S10 and performs the processing again from the top. On the other hand, if control section 100 determines that the switch is no longer pressed (step S140, YES), control section 100 ends the processing.

Next, with reference to FIG. 29, the processing using the resonance method will be described.

Steps S10 to S30 are substantially the same as those above, and the same processing will be omitted from the following description. Note that in step S20, control section 100 performs control to sweep the frequency of the electromagnetic wave to be output from electromagnetic wave emitting section 10 as appropriate from the reference frequency (66 GHz) in a range of ±a few GHz.

If control section 100 determines that the reflected wave has been received (step S30, YES), control section 100 proceeds to step S45. In this example, as the reflected wave, not only the electromagnetic wave with the reference frequency (66 GHz), but also a tag for which the absorption peak is present at a frequency shifted (deviated) from the reference frequency is used. Thus, prior to step S45, control section 100 temporarily stores information (i.e., unprocessed data) of the absorption peak (resonance frequency) in each received reflected wave.

In step S45, control section 100 analyzes the unprocessed data of the received reflected wave (hereinafter referred to as a "reflected wave raw data") and extract reflected wave information of the above-described reference point section (plural reference point sections in this example). Herein, the reference point section can be configured to resonate with the reference frequency (66 GHz) or may be configured to resonate with a frequency that deviates from the reference frequency in ±a few GHz. In this example, in order to detect the orientation, inclination, or the like of the tag more accurately, a case is assumed where the reference point section is provided at each corner of a rectangular tag.

In the subsequent step S55, from the extracted reflected wave information of each reference point section, control section 100 identifies the orientation and inclination of the tag to perform the above-described calibration processing and to analyze a deviation width of the phase and amplitude resulting from the identified orientation and inclination. Then, on the basis of the analyzed deviation width, control section 100 determines a correction value for correcting the reflected wave raw data.

In the subsequent step S65, control section 100 corrects the reflected wave raw data in accordance with the determined correction value, thereby generating corrected data of the reflected wave information (hereinafter referred to as "corrected reflected wave data"). The corrected reflected wave data is generated for the received reflected wave information at each resonance frequency.

Subsequently, from the generated corrected reflected wave data (i.e., the corrected reflected wave information at each resonance frequency), control section 100 decodes the identification information configured in RFID tag 200 (step S120). The subsequent steps S130 and S140 are substantially the same as those above.

The processing of the imaging method (FIG. 28) and the processing of the resonance method (FIG. 29) are separately described for simplicity. However, control section 100 can perform these two methods concurrently or in an integrated manner.

In the above manner, according to the embodiment to which the present invention is applied, capacitance of recorded information on an RFID tag and reading accuracy can be increased.

Besides, any of the above embodiments merely describes specific examples for implementing the present invention, and these specific examples are not intended to limit the technical scope of the present invention. That is, the present invention can be implemented in various manners without departing from its spirit or primary characteristics.

The disclosure of Japanese Patent Application No. 2017-190590, filed on Sep. 29, 2017, including the specification, drawings, and abstract, is incorporated herein by reference in its entirety.

REFERENCE SIGNS LIST

2 Tag reader (determination apparatus)
10 Electromagnetic wave emitting section
20 Electromagnetic wave receiving section
30 Operation input section
40 Display section
50 Storage section
100 Control section (determination section)
200 RFID tag (contactlessly readable tag)
201 Base
201M Metal substrate
202 Electromagnetic wave absorber
202-1 to 202-3 Electromagnetic wave absorber with different absorption frequency bands
202-P1 to 202-P4 Electromagnetic wave absorber formed of photonic crystals
2021 First composition material
2022 Second composition material
203 (203A, 203B) resonance shift material (resonance shift section)
204 Metal section
204F Metal flake
204T Metal thin film
205 (205A, 205B) Composition of metal and electromagnetic wave absorber
206 Resonance hole
207 Reactive member
207a Region where electromagnetic wave absorbing property appears
208 Protective layer
209 Adhesive layer
210 Dielectric layer
300 Resin

The invention claimed is:

1. A contactlessly readable tag, comprising:
a metal section; and
an electromagnetic wave absorber,
wherein an installation manner of the metal section and the electromagnetic wave absorber is associated with identification information, and
wherein, when an electromagnetic wave is radiated to the tag, a magnitude of an amplitude of a reflected electromagnetic wave and a frequency shift or a phase shift are detected as electromagnetic wave reflection information and the identification information corresponds to the electromagnetic wave reflection information.

2. The contactlessly readable tag of claim 1,
wherein the metal section includes a form in which metal and the electromagnetic wave absorber are mixed, and wherein a mixed ratio of the metal and the electromagnetic wave absorber is associated with the identification information.

3. The contactlessly readable tag of claim 1,
wherein the metal section includes a resonance shift section that resonates with a different frequency from a reference resonance frequency, and
wherein a resonance frequency of the resonance shift section is associated with the identification information.

4. The contactlessly readable tag of claim 1,
wherein, in the metal section, a plurality of resonance holes for resonating the electromagnetic wave are provided, and
wherein the electromagnetic wave absorber is arranged in at least one of the resonance holes.

5. The contactlessly readable tag of claim 1, further comprising:
a base on which the metal section and the electromagnetic wave absorber are provided.

6. The contactlessly readable tag of claim 5,
wherein the base is porous, and at least one of the metal section and the electromagnetic wave absorber enters the base in a thickness direction of the base, wherein the thickness direction is normal to a surface of the base.

7. The contactlessly readable tag of claim 5,
wherein the metal section and the electromagnetic wave absorber are arranged on each of a top surface and a back surface of the base.

8. The contactlessly readable tag of claim 5,
wherein a plurality of the metal sections are arranged on the base, and at least one of the plurality of metal sections is covered with the electromagnetic wave absorber.

9. The contactlessly readable tag of claim 1,
wherein the metal section includes a plurality of metal flakes whose long sides are oriented in isotropic directions.

10. The contactlessly readable tag of claim 1,
wherein a plurality of the electromagnetic wave absorbers having mutually different absorption frequency bands are stacked on the metal section.

11. The contactlessly readable tag of claim 1,
wherein the metal section includes a plurality of metal patterns whose long sides are oriented in a plurality of directions.

12. The contactlessly readable tag of claim 1,
wherein the electromagnetic wave absorber includes a photonic crystal.

13. The contactlessly readable tag of claim 1,
wherein a protective layer that protects the metal section and the electromagnetic wave absorber is provided.

14. The contactlessly readable tag of claim 1,
wherein an adhesive section for attaching the contactlessly readable tag onto an object is provided.

15. The contactlessly readable tag of claim 5,
wherein the base has an electromagnetic wave transmitting property.

16. The contactlessly readable tag of claim 1,
wherein a plurality of the metal sections are provided, and metal particles forming the metal sections have different sizes.

17. The contactlessly readable tag of claim 1,
wherein the metal section includes a thin film that allows part of the electromagnetic wave to transmit through the thin film when the electromagnetic wave is radiated.

18. A method for manufacturing a contactlessly readable tag including a metal section and an electromagnetic wave absorber, the method comprising:
forming at least one of the metal section and the electromagnetic wave absorber on a base by a printing method, wherein an installation manner of the metal section and the electromagnetic wave absorber is associated with identification information, and
wherein, when an electromagnetic wave is radiated to the tag, a magnitude of an amplitude of a reflected electromagnetic wave and a frequency shift or a phase shift are detected as electromagnetic wave reflection information and the identification information corresponds to the electromagnetic wave reflection information.

19. The method for manufacturing a contactlessly readable tag of claim 18,
wherein the metal section is formed by patterning toner containing metal flakes by electrophotography.

20. The method for manufacturing a contactlessly readable tag of claim 18,
wherein the electromagnetic wave absorber is formed by patterning toner containing a material having an electromagnetic wave absorbing property by electrophotography.

21. The method for manufacturing a contactlessly readable tag of claim 18, further comprising:
forming, on the metal section, a reactive member having an electromagnetic wave absorbing property that changes by radiation of an electromagnetic wave with a predetermined wavelength; and
radiating the electromagnetic wave with the predetermined wavelength to at least part of the reactive member.

22. A determination apparatus used for determining a contactlessly readable tag, comprising:
a determination section that determines, when an electromagnetic wave is radiated to the tag, a magnitude of an amplitude of a reflected electromagnetic wave and a frequency shift or a phase shift are detected as electromagnetic wave reflection information and the identification information corresponds to the electromagnetic wave reflection information.

23. An identification information reading method for reading identification information from a contactlessly readable tag including a metal section and an electromagnetic wave absorber, an installation manner of the metal section and the electromagnetic wave absorber being associated with the identification information, the method comprising:
determining, when an electromagnetic wave is radiated to the contactlessly readable tag, a magnitude of an amplitude of a reflected electromagnetic wave and a frequency shift or a phase shift are detected as electromagnetic wave reflection information and the identification information corresponds to the electromagnetic wave reflection information.

* * * * *